United States Patent
Hall et al.

(10) Patent No.: US 10,590,338 B2
(45) Date of Patent: Mar. 17, 2020

(54) WRINKLED CAPSULES FOR TREATMENT OF SUBTERRANEAN FORMATIONS

(71) Applicant: Halliburton Energy Services, Inc., Houston, TX (US)

(72) Inventors: Lee J. Hall, The Woodlands, TX (US); Jay Paul Deville, Spring, TX (US); Maria Ina, Chapel Hill, NC (US); Sergey Sheyko, Chapel Hill, NC (US); Michael Rubinstein, Chapel Hill, NC (US)

(73) Assignees: Halliburton Energy Services, Inc., Houston, TX (US); The University of North Carolina at Chapel Hill, Chapel Hill, NC (US)

( * ) Notice: Subject to any disclaimer, the term of this patent is extended or adjusted under 35 U.S.C. 154(b) by 0 days.

(21) Appl. No.: 15/750,097

(22) PCT Filed: Sep. 2, 2015

(86) PCT No.: PCT/US2015/048135
§ 371 (c)(1),
(2) Date: Feb. 2, 2018

(87) PCT Pub. No.: WO2017/039652
PCT Pub. Date: Mar. 9, 2017

(65) Prior Publication Data
US 2018/0223180 A1   Aug. 9, 2018

(51) Int. Cl.
*E21B 43/22* (2006.01)
*E21B 43/267* (2006.01)
(Continued)

(52) U.S. Cl.
CPC .............. *C09K 8/92* (2013.01); *C09K 8/00* (2013.01); *C09K 8/03* (2013.01); *C09K 8/28* (2013.01);
(Continued)

(58) Field of Classification Search
CPC . C09K 8/92; C09K 8/03; C09K 8/516; C09K 8/536; C09K 8/70; C09K 8/00;
(Continued)

(56) References Cited

U.S. PATENT DOCUMENTS 6,528,157 B1    3/2003   Hussain et al.
7,135,231 B1 *  11/2006  Sinclair ................. C09K 8/805
                                                      428/407

(Continued)

FOREIGN PATENT DOCUMENTS

CA          2432119         6/2002

OTHER PUBLICATIONS

International Search Report and Written Opinion for Application No. PCT/US2015/048135 dated May 13, 2016.
(Continued)

*Primary Examiner* — Zakiya W Bates
(74) *Attorney, Agent, or Firm* — Tenley Krueger; C. Tumey Law Group PLLC

(57) ABSTRACT

Various embodiments disclosed relate to wrinkled capsules for treatment of subterranean formations. In various embodiments, the present invention provides a method of treating a subterranean formation. The method includes placing in the subterranean formation a composition comprising at least one wrinkled capsule. The wrinkled capsule includes a hydrophobic core and a wrinkled shell.

19 Claims, 13 Drawing Sheets

(51) Int. Cl.
| | |
|---|---|
| *C09K 8/92* | (2006.01) |
| *C09K 8/516* | (2006.01) |
| *C09K 8/536* | (2006.01) |
| *C09K 8/70* | (2006.01) |
| *C09K 8/03* | (2006.01) |
| *C09K 8/80* | (2006.01) |
| *C09K 8/00* | (2006.01) |
| *C09K 8/28* | (2006.01) |
| *C09K 8/467* | (2006.01) |
| *C09K 8/508* | (2006.01) |
| *C09K 8/588* | (2006.01) |
| *C09K 8/68* | (2006.01) |
| *C09K 8/72* | (2006.01) |
| *E21B 21/00* | (2006.01) |
| *E21B 33/13* | (2006.01) |
| *E21B 37/00* | (2006.01) |
| *E21B 43/26* | (2006.01) |
| *E21B 47/00* | (2012.01) |

(52) U.S. Cl.
CPC ............ *C09K 8/467* (2013.01); *C09K 8/5083* (2013.01); *C09K 8/516* (2013.01); *C09K 8/536* (2013.01); *C09K 8/588* (2013.01); *C09K 8/68* (2013.01); *C09K 8/70* (2013.01); *C09K 8/725* (2013.01); *C09K 8/805* (2013.01); *E21B 21/00* (2013.01); *E21B 33/13* (2013.01); *E21B 37/00* (2013.01); *E21B 43/26* (2013.01); *E21B 47/0002* (2013.01)

(58) Field of Classification Search
CPC ........ C09K 8/28; C09K 8/467; C09K 8/5083; C09K 8/588; C09K 8/68; C09K 8/725; C09K 8/805; E21B 21/00; E21B 33/13; E21B 37/00; E21B 43/26; E21B 47/0002
See application file for complete search history.

(56) References Cited

U.S. PATENT DOCUMENTS

| | | |
|---|---|---|
| 7,244,492 B2 | 6/2007 | Sinclair et al. |
| 2007/0224899 A1 | 9/2007 | Dungworth et al. |
| 2008/0234146 A1 | 9/2008 | Barmatov et al. |
| 2011/0114387 A1 | 5/2011 | Belcher et al. |

OTHER PUBLICATIONS

Expancel Akzonobel product overview copyright 2016.
3MTM Glass Bubbles product brochure copyright 2017.
Office Action dated Dec. 6, 2018, from Canadian Patent Application No. 2,992,554.

* cited by examiner

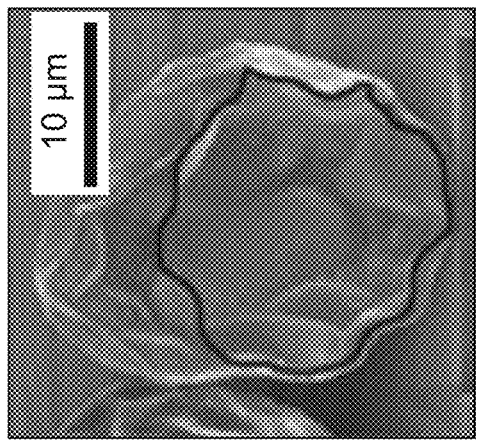
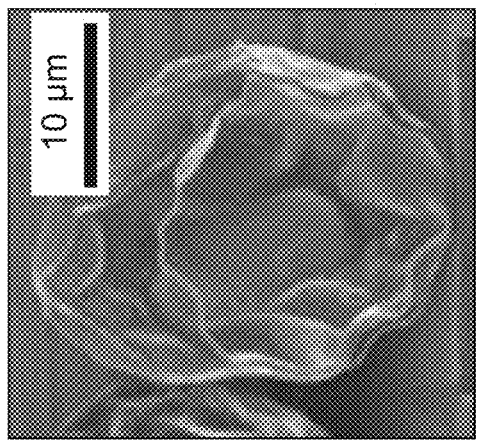
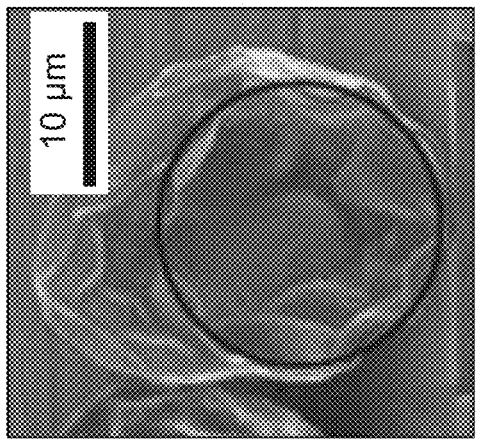
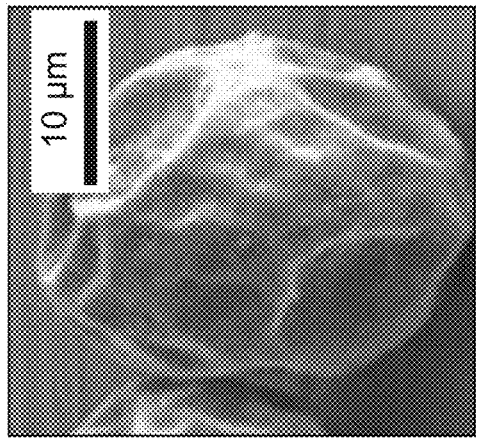
Fig. 7A
Fig. 7B
Fig. 7C
Fig. 7D

WRINKLED CAPSULES FOR TREATMENT OF SUBTERRANEAN FORMATIONS

BACKGROUND

During the treatment of subterranean formations for petroleum extraction, the use of precise chemical compositions downhole is important for a wide variety of purposes. Current techniques expose all chemical components of a composition for use downhole to tubulars and to other materials downhole en route to a desired location with limited or no ability to control or modulate the concentration or reactivity of particular chemical components on their way to a target location.

Pore blocking in subterranean formations is often accomplished using particles that tend to allow leaks around the perimeter of the particles, such as rigid and spherical particles.

BRIEF DESCRIPTION OF THE FIGURES

The drawings illustrate generally, by way of example, but not by way of limitation, various embodiments discussed in the present document.

FIGS. 7A-D illustrate SEM-images showing the perimeter and circumference of the shell of a wrinkled capsule having a shell:core volume ratio of 70:30, in accordance with various embodiments.

DETAILED DESCRIPTION OF THE INVENTION

Figures 1A, 1B, 1C, 1D, 1E:
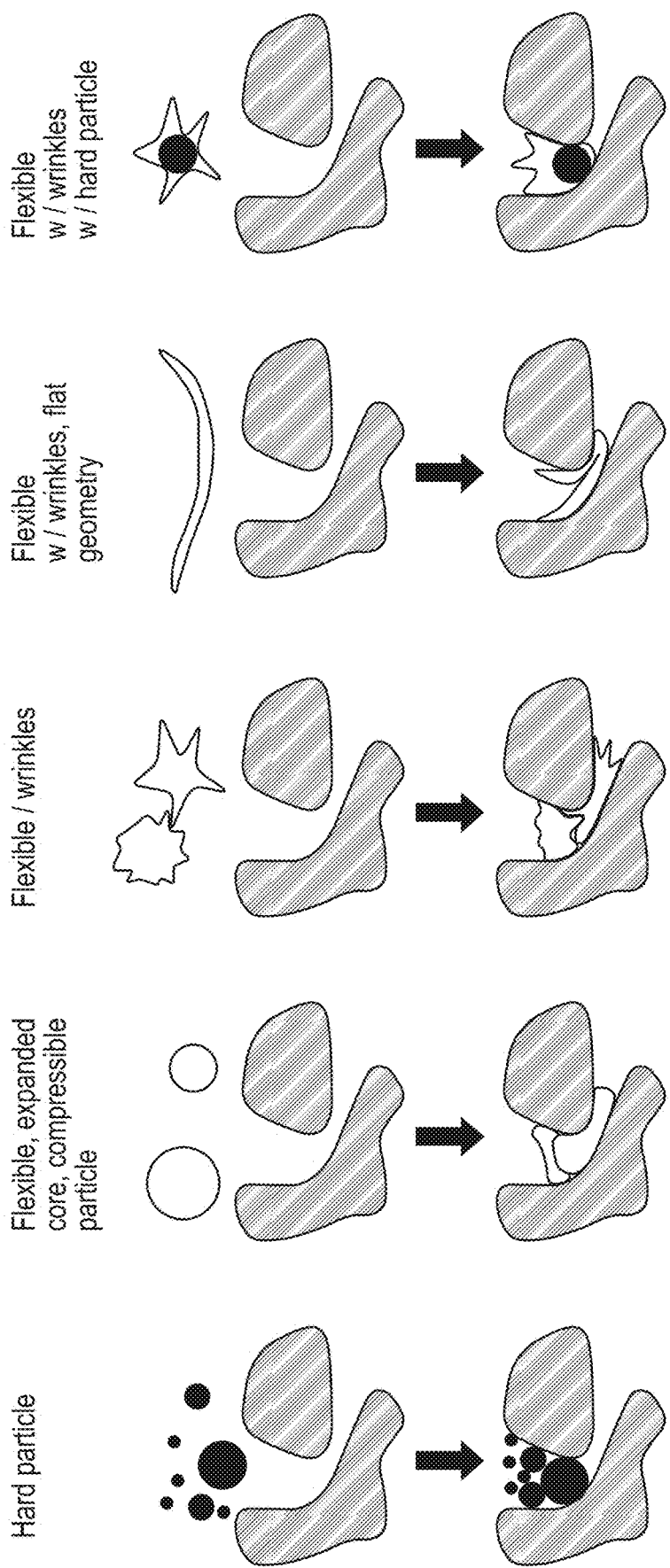
FIGS. 1A-E illustrate various pore clogging mechanisms, in accordance with various embodiments.

Reference will now be made in detail to certain embodiments of the disclosed subject matter, examples of which are illustrated in part in the accompanying drawings. While the disclosed subject matter will be described in conjunction with the enumerated claims, it will be understood that the exemplified subject matter is not intended to limit the claims to the disclosed subject matter.

In this document, values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed herein, and not otherwise defined, is for the purpose of description only and not of limitation. Any use of section headings is intended to aid reading of the document and is not to be interpreted as limiting; information that is relevant to a section heading may occur within or outside of that particular section. A comma can be used as a delimiter or digit group separator to the left or right of a decimal mark; for example, "0.000,1" is equivalent to "0.0001."

In the methods described herein, the acts can be carried out in any order without departing from the principles of the invention, except when a temporal or operational sequence is explicitly recited. Furthermore, specified acts can be carried out concurrently unless explicit claim language recites that they be carried out separately. For example, a claimed act of doing X and a claimed act of doing Y can be conducted simultaneously within a single operation, and the resulting process will fall within the literal scope of the claimed process.

The term "about" as used herein can allow for a degree of variability in a value or range, for example, within 10%, within 5%, or within 1% of a stated value or of a stated limit of a range, and includes the exact stated value or range.

The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more, or 100%.

The term "organic group" as used herein refers to any carbon-containing functional group. Examples include an oxygen-containing group such as an alkoxy group, aryloxy group, aralkyloxy group, oxo(carbonyl) group; a carboxyl group including a carboxylic acid, carboxylate, and a carboxylate ester; a sulfur-containing group such as an alkyl and aryl sulfide group; and other heteroatom-containing groups. Non-limiting examples of organic groups include OR, OOR, OC(O)N(R)$_2$, CN, CF$_3$, OCF$_3$, R, C(O), methylenedioxy, ethylenedioxy, N(R)$_2$, SR, SOR, SO$_2$R, SO$_2$N(R)$_2$, SO$_3$R, C(O)R, C(O)C(O)R, C(O)CH$_2$C(O)R, C(S)R, C(O)OR, OC(O)R, C(O)N(R)$_2$, OC(O)N(R)$_2$, C(S)N(R)$_2$, (CH$_2$)$_{0-2}$N(R)C(O)R, (CH$_2$)$_{0-2}$N(R)N(R)$_2$, N(R)N(R)C(O)R, N(R)N(R)C(O)OR, N(R)N(R)CON(R)$_2$, N(R)SO$_2$R, N(R)SO$_2$N(R)$_2$, N(R)C(O)OR, N(R)C(O)R, N(R)C(S)R, N(R)C(O)N(R)$_2$, N(R)C(S)N(R)$_2$, N(COR)COR, N(OR)R, C(=NH)N(R)$_2$, C(O)N(OR)R, C(=NOR)R, and substituted or unsubstituted (C$_1$-C$_{100}$)hydrocarbyl, wherein R can be hydrogen (in examples that include other carbon atoms) or a carbon-based moiety, and wherein the carbon-based moiety can itself be substituted or unsubstituted.

The term "substituted" as used herein in conjunction with a molecule or an organic group as defined herein refers to the state in which one or more hydrogen atoms contained therein are replaced by one or more non-hydrogen atoms. The term "functional group" or "substituent" as used herein refers to a group that can be or is substituted onto a molecule or onto an organic group. Examples of substituents or functional groups include, but are not limited to, a halogen (e.g., F, Cl, Br, and I); an oxygen atom in groups such as hydroxy groups, alkoxy groups, aryloxy groups, aralkyloxy groups, oxo(carbonyl) groups, carboxyl groups including carboxylic acids, carboxylates, and carboxylate esters; a sulfur atom in groups such as thiol groups, alkyl and aryl sulfide groups, sulfoxide groups, sulfone groups, sulfonyl groups, and sulfonamide groups; a nitrogen atom in groups such as amines, hydroxyamines, nitriles, nitro groups, N-oxides, hydrazides, azides, and enamines; and other heteroatoms in various other groups. Non-limiting examples of substituents that can be bonded to a substituted carbon (or other) atom include F, Cl, Br, I, OR, OC(O)N(R)$_2$, CN, NO, NO$_2$, ONO$_2$, azido, CF$_3$, OCF$_3$, R, O (oxo), S (thiono), C(O), S(O), methylenedioxy, ethylenedioxy, N(R)$_2$, SR, SOR, SO$_2$R, SO$_2$N(R)$_2$, SO$_3$R, C(O)R, C(O)C(O)R, C(O)CH$_2$C(O)R, C(S)R, C(O)OR, OC(O)R, C(O)N(R)$_2$, OC(O)N(R)$_2$, C(S)N(R)$_2$, (CH$_2$)$_{0-2}$N(R)C(O)R, (CH$_2$)$_{0-2}$N(R)N(R)$_2$, N(R)N(R)C(O)R, N(R)N(R)C(O)OR, N(R)N(R)CON(R)$_2$, N(R)SO$_2$R, N(R)SO$_2$N(R)$_2$, N(R)C(O)OR, N(R)C(O)R, N(R)C(S)R, N(R)C(O)N(R)$_2$, N(R)C(S)N(R)$_2$, N(COR)COR, N(OR)R, C(=NH)N(R)$_2$, C(O)N(OR)R, and C(=NOR)R, wherein R can be hydrogen or a carbon-based moiety; for example, R can be hydrogen, (C$_1$-C$_{100}$)hydrocarbyl, alkyl, acyl, cycloalkyl, aryl, aralkyl, heterocyclyl, heteroaryl, or heteroarylalkyl; or wherein two R groups bonded to a nitrogen atom or to adjacent nitrogen atoms can together with the nitrogen atom or atoms form a heterocyclyl.

The term "alkyl" as used herein refers to straight chain and branched alkyl groups and cycloalkyl groups having from 1 to 40 carbon atoms, 1 to about 20 carbon atoms, 1 to 12 carbons or, in some embodiments, from 1 to 8 carbon atoms. Examples of straight chain alkyl groups include those with from 1 to 8 carbon atoms such as methyl, ethyl, n-propyl, n-butyl, n-pentyl, n-hexyl, n-heptyl, and n-octyl groups. Examples of branched alkyl groups include, but are not limited to, isopropyl, iso-butyl, sec-butyl, t-butyl, neopentyl, isopentyl, and 2,2-dimethylpropyl groups. As used herein, the term "alkyl" encompasses n-alkyl, isoalkyl, and anteisoalkyl groups as well as other branched chain forms of alkyl. Representative substituted alkyl groups can be substituted one or more times with any of the groups listed herein, for example, amino, hydroxy, cyano, carboxy, nitro, thio, alkoxy, and halogen groups.

The term "alkenyl" as used herein refers to straight and branched chain and cyclic alkyl groups as defined herein, except that at least one double bond exists between two carbon atoms. Thus, alkenyl groups have from 2 to 40 carbon atoms, or 2 to about 20 carbon atoms, or 2 to 12 carbon atoms or, in some embodiments, from 2 to 8 carbon atoms. Examples include, but are not limited to, vinyl, —CH=CH(CH$_3$), —CH=C(CH$_3$)$_2$, —C(CH$_3$)=CH$_2$, —C(CH$_3$)=CH(CH$_3$), —C(CH$_2$CH$_3$)=CH$_2$, cyclohexenyl, cyclopentenyl, cyclohexadienyl, butadienyl, pentadienyl, and hexadienyl among others.

The term "acyl" as used herein refers to a group containing a carbonyl moiety wherein the group is bonded via the carbonyl carbon atom. The carbonyl carbon atom is bonded to a hydrogen forming a "formyl" group or is bonded to another carbon atom, which can be part of an alkyl, aryl, aralkyl cycloalkyl, cycloalkylalkyl, heterocyclyl, heterocyclylalkyl, heteroaryl, heteroarylalkyl group or the like. An acyl group can include 0 to about 12, 0 to about 20, or 0 to about 40 additional carbon atoms bonded to the carbonyl group. An acyl group can include double or triple bonds within the meaning herein. An acryloyl group is an example of an acyl group. An acyl group can also include heteroatoms within the meaning herein. A nicotinoyl group (pyridyl-3-carbonyl) is an example of an acyl group within the meaning herein. Other examples include acetyl, benzoyl, phenylacetyl, pyridylacetyl, cinnamoyl, and acryloyl groups and the like. When the group containing the carbon atom that is bonded to the carbonyl carbon atom contains a halogen, the group is termed a "haloacyl" group. An example is a trifluoroacetyl group.

The term "aryl" as used herein refers to cyclic aromatic hydrocarbon groups that do not contain heteroatoms in the ring. Thus aryl groups include, but are not limited to, phenyl, azulenyl, heptalenyl, biphenyl, indacenyl, fluorenyl, phenanthrenyl, triphenylenyl, pyrenyl, naphthacenyl, chrysenyl, biphenylenyl, anthracenyl, and naphthyl groups. In some embodiments, aryl groups contain about 6 to about 14 carbons in the ring portions of the groups. Aryl groups can be unsubstituted or substituted, as defined herein. Representative substituted aryl groups can be mono-substituted or substituted more than once, such as, but not limited to, a phenyl group substituted at any one or more of 2-, 3-, 4-, 5-, or 6-positions of the phenyl ring, or a naphthyl group substituted at any one or more of 2- to 8-positions thereof.

The term "heterocyclyl" as used herein refers to aromatic and non-aromatic ring compounds containing three or more ring members, of which one or more is a heteroatom such as, but not limited to, N, O, and S.

The terms "halo," "halogen," or "halide" group, as used herein, by themselves or as part of another substituent, mean, unless otherwise stated, a fluorine, chlorine, bromine, or iodine atom.

The term "haloalkyl" group, as used herein, includes mono-halo alkyl groups, poly-halo alkyl groups wherein all halo atoms can be the same or different, and per-halo alkyl groups, wherein all hydrogen atoms are replaced by halogen atoms, such as fluoro. Examples of haloalkyl include trifluoromethyl, 1,1-dichloroethyl, 1,2-dichloroethyl, 1,3-dibromo-3,3-difluoropropyl, perfluorobutyl, and the like.

The term "hydrocarbon" or "hydrocarbyl" as used herein refers to a molecule or functional group, respectively, that includes carbon and hydrogen atoms. The term can also refer to a molecule or functional group that normally includes both carbon and hydrogen atoms but wherein all the hydrogen atoms are substituted with other functional groups. A hydrocarbyl group can be a functional group derived from a straight chain, branched, or cyclic hydrocarbon, and can be alkyl, alkenyl, alkynyl, aryl, cycloalkyl, acyl, or any combination thereof. Hydrocarbyl groups can be shown as $(C_a\text{-}C_b)$hydrocarbyl, wherein a and b are positive integers and mean having any of a to b number of carbon atoms. For example, $(C_1\text{-}C_4)$hydrocarbyl means the hydrocarbyl group can be methyl ($C_1$), ethyl ($C_2$), propyl ($C_3$), or butyl ($C_4$), and $(C_0\text{-}C_b)$hydrocarbyl means in certain embodiments there is no hydrocarbyl group.

The term "solvent" as used herein refers to a liquid that can dissolve a solid, liquid, or gas. Non-limiting examples of solvents are silicones, organic compounds, water, alcohols, ionic liquids, and supercritical fluids.

The term "number-average molecular weight" ($M_n$) as used herein refers to the ordinary arithmetic mean of the molecular weight of individual molecules in a sample. It is defined as the total weight of all molecules in a sample divided by the total number of molecules in the sample. Experimentally, $M_n$ is determined by analyzing a sample divided into molecular weight fractions of species i having $n_i$ molecules of molecular weight $M_i$ through the formula $M_n = \Sigma M_i n_i / \Sigma n_i$. The $M_n$ can be measured by a variety of well-known methods including gel permeation chromatography, spectroscopic end group analysis, and osmometry.

The term "room temperature" as used herein refers to a temperature of about 15° C. to 28° C.

The term "standard temperature and pressure" as used herein refers to 20° C. and 101 kPa.

As used herein, "degree of polymerization" is the number of repeating units in a polymer.

As used herein, the term "polymer" refers to a molecule having at least one repeating unit and can include copolymers.

The term "copolymer" as used herein refers to a polymer that includes at least two different repeating units. A copolymer can include any suitable number of repeating units.

The term "downhole" as used herein refers to under the surface of the earth, such as a location within or fluidly connected to a wellbore.

As used herein, the term "drilling fluid" refers to fluids, slurries, or muds used in drilling operations downhole, such as during the formation of the wellbore.

As used herein, the term "stimulation fluid" refers to fluids or slurries used downhole during stimulation activities of the well that can increase the production of a well, including perforation activities. In some examples, a stimulation fluid can include a fracturing fluid or an acidizing fluid.

As used herein, the term "clean-up fluid" refers to fluids or slurries used downhole during clean-up activities of the well, such as any treatment to remove material obstructing the flow of desired material from the subterranean formation. In one example, a clean-up fluid can be an acidification treatment to remove material formed by one or more perforation treatments. In another example, a clean-up fluid can be used to remove a filter cake.

As used herein, the term "fracturing fluid" refers to fluids or slurries used downhole during fracturing operations.

As used herein, the term "spotting fluid" refers to fluids or slurries used downhole during spotting operations, and can be any fluid designed for localized treatment of a downhole region. In one example, a spotting fluid can include a lost circulation material for treatment of a specific section of the wellbore, such as to seal off fractures in the wellbore and prevent sag. In another example, a spotting fluid can include a water control material. In some examples, a spotting fluid can be designed to free a stuck piece of drilling or extraction equipment, can reduce torque and drag with drilling lubricants, prevent differential sticking, promote wellbore stability, and can help to control mud weight.

As used herein, the term "completion fluid" refers to fluids or slurries used downhole during the completion phase of a well, including cementing compositions.

As used herein, the term "remedial treatment fluid" refers to fluids or slurries used downhole for remedial treatment of a well, and can also be called a "work-over fluid". Remedial treatments, also called work-over treatments, can include treatments designed to increase or maintain the production rate of a well, such as stimulation or clean-up treatments.

As used herein, the term "abandonment fluid" refers to fluids or slurries used downhole during or preceding the abandonment phase of a well.

As used herein, the term "acidizing fluid" refers to fluids or slurries used downhole during acidizing treatments. In one example, an acidizing fluid is used in a clean-up operation to remove material obstructing the flow of desired material, such as material formed during a perforation operation. In some examples, an acidizing fluid can be used for damage removal.

As used herein, the term "cementing fluid" refers to fluids or slurries used during cementing operations of a well. For example, a cementing fluid can include an aqueous mixture including at least one of cement and cement kiln dust. In another example, a cementing fluid can include a curable resinous material such as a polymer that is in an at least partially uncured state.

As used herein, the term "water control material" refers to a solid or liquid material that interacts with aqueous material downhole, such that hydrophobic material can more easily travel to the surface and such that hydrophilic material (including water) can less easily travel to the surface. A water control material can be used to treat a well to cause the proportion of water produced to decrease and to cause the proportion of hydrocarbons produced to increase, such as by selectively binding together material between water-producing subterranean formations and the wellbore while still allowing hydrocarbon-producing formations to maintain output.

As used herein, the term "packer fluid" refers to fluids or slurries that can be placed in the annular region of a well between tubing and outer casing above a packer. In various examples, the packer fluid can provide hydrostatic pressure in order to lower differential pressure across the sealing element, lower differential pressure on the wellbore and casing to prevent collapse, and protect metals and elastomers from corrosion.

As used herein, the term "imaging fluid" refers to fluids or slurries that can be placed in a particular location in a subterranean formation and used to visualize various features downhole via suitable detection techniques, such as via ultrasound, NMR, seismic imaging, or other techniques. An imaging fluid can be a fluid tailored to provide a medium for logging tools such as conductivity, NMR, sonic/ultrasound, pressure, temperature, and the like. The logging tools can be part of drilling bottom hole assembly (BHA), wireline tools, completion tools, and the like.

As used herein, the term "fluid" refers to liquids and gels, unless otherwise indicated.

As used herein, the term "subterranean material" or "subterranean formation" refers to any material under the surface of the earth, including under the surface of the bottom of the ocean. For example, a subterranean formation or material can be any section of a wellbore and any section of a subterranean petroleum- or water-producing formation or region in fluid contact with the wellbore. Placing a material in a subterranean formation can include contacting the material with any section of a wellbore or with any subterranean region in fluid contact therewith. Subterranean materials can include any materials placed into the wellbore such as cement, drill shafts, liners, tubing, casing, or screens; placing a material in a subterranean formation can include contacting with such subterranean materials. In some examples, a subterranean formation or material can be any below-ground region that can produce liquid or gaseous petroleum materials, water, or any section below-ground in fluid contact therewith. For example, a subterranean formation or material can be at least one of an area desired to be fractured, a fracture or an area surrounding a fracture, and a flow pathway or an area surrounding a flow pathway, wherein a fracture or a flow pathway can be optionally fluidly connected to a subterranean petroleum- or water-producing region, directly or through one or more fractures or flow pathways.

As used herein, "treatment of a subterranean formation" can include any activity directed to extraction of water or petroleum materials from a subterranean petroleum- or water-producing formation or region, for example, including drilling, stimulation, hydraulic fracturing, clean-up, acidizing, completion, cementing, remedial treatment, abandonment, and the like.

As used herein, a "flow pathway" downhole can include any suitable subterranean flow pathway through which two subterranean locations are in fluid connection. The flow pathway can be sufficient for petroleum or water to flow from one subterranean location to the wellbore or vice-versa. A flow pathway can include at least one of a hydraulic fracture, and a fluid connection across a screen, across gravel pack, across proppant, including across resin-bonded proppant or proppant deposited in a fracture, and across sand. A flow pathway can include a natural subterranean passageway through which fluids can flow. In some embodiments, a flow pathway can be a water source and can include water. In some embodiments, a flow pathway can be a petroleum source and can include petroleum. In some embodiments, a flow pathway can be sufficient to divert from a wellbore, fracture, or flow pathway connected thereto at least one of water, a downhole fluid, or a produced hydrocarbon.

As used herein, a "carrier fluid" refers to any suitable fluid for suspending, dissolving, mixing, or emulsifying with one or more materials to form a composition. For example, the carrier fluid can be at least one of crude oil, dipropylene glycol methyl ether, dipropylene glycol dimethyl ether, dipropylene glycol methyl ether, dipropylene glycol dimethyl ether, dimethyl formamide, diethylene glycol methyl ether, ethylene glycol butyl ether, diethylene glycol butyl ether, butylglycidyl ether, propylene carbonate, D-limonene, a $C_2$-$C_{40}$ fatty acid $C_1$-$C_{10}$ alkyl ester (e.g., a fatty acid methyl ester), tetrahydrofurfuryl methacrylate, tetrahydrofurfuryl acrylate, 2-butoxy ethanol, butyl acetate, butyl lactate, furfuryl acetate, dimethyl sulfoxide, dimethyl formamide, a petroleum distillation product or fraction (e.g., diesel, kerosene, napthas, and the like) mineral oil, a hydrocarbon oil, a hydrocarbon including an aromatic carbon-carbon bond (e.g., benzene, toluene), a hydrocarbon including an alpha olefin, xylenes, an ionic liquid, methyl ethyl ketone, an ester of oxalic, maleic or succinic acid, methanol, ethanol, propanol (iso- or normal-), butyl alcohol (iso-, tert-, or normal-), an aliphatic hydrocarbon (e.g., cyclohexanone, hexane), water, brine, produced water, flowback water, brackish water, and sea water. The fluid can form about 0.001 wt % to about 99.999 wt % of a composition, or a mixture including the same, or about 0.001 wt % or less, 0.01 wt %, 0.1, 1, 2, 3, 4, 5, 6, 8, 10, 15, 20, 25, 30, 35, 40, 45, 50, 55, 60, 65, 70, 75, 80, 85, 90, 95, 96, 97, 98, 99, 99.9, 99.99, or about 99.999 wt % or more.

In various embodiments, salts having a positively charged counterion can include any suitable positively charged counterion. For example, the counterion can be ammonium ($NH_4^+$), or an alkali metal such as sodium ($Na^{30}$), potassium ($K^+$), or lithium ($Li^+$). In some embodiments, the counterion can have a positive charge greater than +1, which can in some embodiments complex to multiple ionized groups, such as $Zn^{2+}$, $Al^{3+}$, or alkaline earth metals such as $Ca^{2+}$ or $Mg^{2+}$.

In various embodiments, salts having a negatively charged counterion can include any suitable negatively charged counterion. For example, the counterion can be a halide, such as fluoride, chloride, iodide, or bromide. In other examples, the counterion can be nitrate, hydrogen sulfate, dihydrogen phosphate, bicarbonate, nitrite, perchlorate, iodate, chlorate, bromate, chlorite, hypochlorite, hypobromite, cyanide, amide, cyanate, hydroxide, permanganate. The counterion can be a conjugate base of any carboxylic acid, such as acetate or formate. In some embodiments, a counterion can have a negative charge greater than −1, which can in some embodiments complex to multiple ionized groups, such as oxide, sulfide, nitride, arsenate, phosphate, arsenite, hydrogen phosphate, sulfate, thiosulfate, sulfite, carbonate, chromate, dichromate, peroxide, or oxalate.

The polymers described herein can terminate in any suitable way. In some embodiments, the polymers can terminate with an end group that is independently chosen from a suitable polymerization initiator, —H, —OH, a substituted or unsubstituted ($C_1$-$C_{20}$)hydrocarbyl (e.g., ($C_1$-$C_{10}$)alkyl or ($C_6$-$C_{20}$)aryl) interrupted with 0, 1, 2, or 3 groups independently selected from —O—, substituted or unsubstituted —NH—, and —S—, a poly(substituted or unsubstituted ($C_1$-$C_{20}$)hydrocarbyloxy), and a poly(substituted or unsubstituted ($C_1$-$C_{20}$)hydrocarbylamino).

In various embodiments, the present invention provides a method of treating a subterranean formation. The method includes placing in the subterranean formation a composition including at least one wrinkled capsule. The wrinkled capsule includes a hydrophobic core and a wrinkled shell.

In various embodiments, the present invention provides a method of treating a subterranean formation. The method includes placing in the subterranean formation a composition including at least one wrinkled capsule having a particle size of about 0.1 microns to about 500 microns. The wrinkled capsule includes a hydrophobic core that is about 0.001 vol % to about 99.999 vol % of the wrinkled capsule. The hydrophobic core includes a hydrophobic medium including an oil, an organic solvent, or a combination thereof. The wrinkled capsule also includes a wrinkled shell that is about 1 nm to about 10 microns thick and that is about 0.001 vol % to about 99.999 vol % of the wrinkled capsule. The wrinkled shell includes one or more polymers each independently including one or more repeating units formed by polymerization of a substituted or unsubstituted ($C_3$-$C_{50}$) alkenoic acid or a salt or substituted or unsubstituted ($C_1$-$C_{50}$)hydrocarbyl ester thereof, a substituted or unsubstituted ($C_2$-$C_{50}$)alkenylnitrile, a substituted or unsubstituted ($C_2$-$C_{50}$)alkenyl($C_6$-$C_{50}$)aryl, a halide-substituted ($C_2$-$C_{50}$)alkene wherein the ($C_2$-$C_{50}$)alkene is further substituted or unsubstituted, or a combination thereof. In some embodiments, the hydrophobic core can further include cargo including a blowing agent, a lubricant, a tracer, a dye, a contrast enhancer, an acid, an acid-forming reagent, a base, a base-forming reagent, an amine, a catalyst, a breaker, an inorganic particle, a proppant, a liquid, a gas, a dispersed solid, a multi-phase substance, or a combination thereof. The method can further include releasing the cargo in the subterranean formation.

In various embodiments, the present invention provides a system that includes a tubular disposed in a subterranean formation. The system also includes a pump configured to pump a composition including at least one wrinkled capsule in the subterranean formation through the tubular. The wrinkled capsule includes a hydrophobic core and a wrinkled shell.

In various embodiments, the present invention provides a wrinkled capsule for treatment of a subterranean formation. The wrinkled capsule includes a hydrophobic core and a wrinkled shell. Various embodiments provide a composition for treatment of a subterranean formation including at least one of the wrinkled capsules.

In various embodiments, the present invention provides a wrinkled capsule for treatment of a subterranean formation. The wrinkled capsule has a particle size of about 0.1 microns to about 500 microns. The wrinkled capsule includes a hydrophobic core that is about 0.001 vol % to about 99.999 vol % of the wrinkled capsule. The hydrophobic core includes a hydrophobic medium including an oil, an organic solvent, or a combination thereof. The wrinkled capsule also includes a wrinkled shell that is about 1 nm to about 10 microns thick and that is about 0.001 vol % to about 99.999 vol % of the wrinkled capsule. The wrinkled shell includes one or more polymers each independently including one or more repeating units formed by polymerization of a substituted or unsubstituted $(C_3-C_{50})$alkenoic acid or a salt or substituted or unsubstituted $(C_1-C_{50})$hydrocarbyl ester thereof, a substituted or unsubstituted $(C_2-C_{50})$alkenylnitrile, a substituted or unsubstituted $(C_2-C_{50})$alkenyl$(C_6-C_{50})$ aryl, a halide-substituted $(C_2-C_{50})$alkene wherein the $(C_2-C_{50})$alkene is further substituted or unsubstituted, or a combination thereof. In some embodiments, the core can further include cargo including a blowing agent, a lubricant, a tracer, a dye, a contrast enhancer, an acid, an acid-forming reagent, a base, a base-forming reagent, an amine, a catalyst, a breaker, an inorganic particle, a proppant, a liquid, a gas, a dispersed solid, a multi-phase substance, or a combination thereof various embodiments provide a composition for treatment of a subterranean formation including at least one of the wrinkled capsules.

In various embodiments, the present invention provides a method of preparing a composition for treatment of a subterranean formation. The method includes forming a composition including at least one wrinkled capsule. The wrinkled capsule includes a hydrophobic core and a wrinkled shell.

Various embodiments of the wrinkled capsule and method of using the same for treatment of a subterranean formation have advantages over other subterranean treatment materials and methods of using the same, at least some of which are unexpected. For example, in various embodiments, the wrinkled capsules can encapsulate a wide variety of cargo, such as a blowing agent, a lubricant, a tracer, a dye, a contrast enhancer, an acid, an acid-forming reagent, a base, a base-forming reagent, an amine, a catalyst, a breaker, an inorganic particle, a proppant, a liquid, a gas, a dispersed solid, a multi-phase substance, or a combination thereof. In various embodiments, the encapsulation of inorganic particles can provide magnetic, electronic, and catalytic properties to the wrinkled capsule.

In various embodiments, the wrinkled capsule can have a large surface area to volume ratio, which can increase the rate of diffusion of various cargo through the shell of the capsule, and that can increase the rate of adsorption of various substances onto the capsule. In various embodiments, the degree of wrinkling of the wrinkled capsules can be varied from a single dimpled structure to a highly crumpled structure. In various embodiments, the wrinkled capsule can be designed to expand under various conditions (e.g., to a substantially spherical bubble-shape), to provide pore clogging or to provide a triggered release of cargo. In various embodiments, the wrinkled capsule can have an enhanced release rate of cargo compared to other capsules, such as due to the wrinkling of the shell (e.g., higher surface area) and the thin shell. In various embodiments, the wrinkled capsule can release cargo via diffusion or via breaking of the shell of the wrinkled capsule. In various embodiments, the broken shell of the wrinkled capsule can be non-abrasive, in contrast to glass shells or other hard shell materials. In various embodiments, the wrinkled capsules can have a low density, and can be used as light-weight fillers. In some embodiments, the core of the wrinkled capsules can provide light scattering properties.

In various embodiments, the properties of the wrinkled capsule can be easily varied and customized to provide desired properties for a particular use or environment. In various embodiments, the one or more monomers used to form the shell and the contents of the core can be varied to provide desired surface morphologies, surface properties (e.g., surface energy and adhesion), and thermo-mechanical properties including elastic modulus of the shell, glass transition temperature of the shell, expansion temperature of the wrinkled particle, and the expansion ratio under various conditions. In various embodiments, the surface-to-volume ratio can be controlled, such as by varying the materials of the shell and by using blowing agents in the core with a particular volatility. In various embodiments, the shape of the wrinkled capsule can be adjusted, as well as how the shape changes at various pressures, temperatures, and under shear. In various embodiments, the shell of the wrinkled capsules can be adjusted such that it has sufficient strength or toughness to avoid fracture of the shell under particular conditions, such as temperature, pressure, and shear. In various embodiments, the size of the wrinkled capsules and the thickness of the shell can be adjusted to provide a desired release behavior. In various embodiments, the wrinkled capsule can have a thicker shell, providing a slower diffusion rate of cargo through the shell. In various embodiments, by choosing a suitable type and amount of cargo, such as choosing a suitable type and amount of one or more blowing agents having a desired volatility at a particular temperature, the degree of wrinkling under a particular environment can be controlled and adjusted. In various embodiments, one or more co-monomers of the shell can act as blowing agents which can result in expansion of the capsules and subsequent formation of wrinkles. In various embodiments, by choosing a suitable type of shell monomer, such as by choosing a suitable type of one or more co-monomers displaying a desired change in density upon polymerization, the degree of wrinkling under a particular environment can be controlled and adjusted. In various embodiments, the amount of wrinkles of the wrinkled capsule can be increased, providing a higher rate of diffusion through the shell. In various embodiments, modifying the geometry of the wrinkles, such as by increasing the amount of wrinkles or increasing the size of the wrinkled folds, can provide certain interactions with surroundings such as higher friction with surrounding fluids and correspondingly better ability to keep up with flow rates of surrounding fluids and avoid settling, entanglement with adjacent particles, or increased adhesion to surroundings.

In various embodiments, the wrinkles of the wrinkled capsules can provide unique and valuable interactions with the surrounding environment in a subterranean formation. In various embodiments, the wrinkles of the wrinkled capsules can allow the wrinkled capsules to provide excellent pore clogging, wherein the flexible wrinkles can block leaks around the perimeter of the particles. In various embodiments, the wrinkled capsule can be designed to be flexible such that it can pass through pores having a much smaller diameter than the relaxed wrinkled capsule (e.g., the wrinkled capsule floating freely in a solution), such as 10% or less of the relaxed diameter, permitting the wrinkled capsule to enter far into subterranean passages.

In various embodiments, the wrinkled capsules can expand under various conditions to provide pore clogging at a desired location, such as after travelling through other small pores or flow pathways that are too small to permit passage of a particle having the dimensions of the expanded wrinkled capsule. In various embodiments, the wrinkled capsules can have an enhanced ability to expand under various conditions as compared to spherical capsules, such as due to the extra shell material available in the folds of the wrinkles of the shell. In various embodiments, the wrinkled capsules can pack together with a higher efficiency and create a tighter seal than hard particles or spherical particles used alone. In various embodiments, the wrinkled capsules can pack with increased ease and speed as compared to other particles. In various embodiments, the wrinkled surface can provide higher friction when the wrinkled capsule is stuck in a pore, providing a stronger blocking effect for the pore than a spherical particle alone. In various embodiments, the wrinkled capsule can include a hard cargo, such that the hard cargo can jam tightly into a space while the softer remaining wrinkled shell can clog and seal the edges around the particle, offering advantages of a hard particle and of a wrinkled particle in a single particle.

In various embodiments, the wrinkles in the wrinkled capsules can be formed without using and chemical or physical (e.g., compression) post-synthesis treatment. In various embodiments, upon heating, the wrinkled capsules can transform into a spheroid or spherical shape. In various embodiments, the degree of wrinkling of the wrinkled capsules is controllable. In various embodiments, the wrinkled capsules can be easily mass-produced. In various embodiments, a wide variety of shell/core compositions can be used to make the wrinkled capsules. In various embodiments, the wrinkled capsules can have a long shelf-life at temperatures less than the glass transition temperature of the shell, with little to no leakage of core materials over long periods.

In various embodiments, the wrinkled capsules can be formed using inexpensive starting materials. In various embodiments, the microcapsules can be made via an simple and convenient synthesis technique, such as using a one-pot one-step synthesis, as distinguished from other particles that are made by methods such as emulsion polymerization, dispersion polymerization, suspension polymerization, interfacial polymerization, self-assembly, templating method, coacervation-phase separation, solvent evaporation, interfacial polycondensation, spray-drying, or microfluidics. In various embodiments, the wrinkled surface of the wrinkled capsules can be formed without any treatments after polymerization. In various embodiments, the wrinkled capsules can be formed without UV-initiated polymerization. In various embodiments, the wrinkled capsules can be made via polymerization at mild temperature and pressure conditions, such as 50° C. and 1 atm, respectively.

Method of Treating a Subterranean Formation.

In some embodiments, the present invention provides a method of treating a subterranean formation. The method includes placing a composition including at least one wrinkled capsule in a subterranean formation. The wrinkled capsule includes a hydrophobic core and a wrinkled shell. The placing of the composition in the subterranean formation can include contacting the composition and any suitable part of the subterranean formation, or contacting the composition and a subterranean material, such as any suitable subterranean material. The subterranean formation can be any suitable subterranean formation. In some examples, the placing of the composition in the subterranean formation includes contacting the composition with or placing the composition in at least one of a fracture, at least a part of an area surrounding a fracture, a flow pathway, an area surrounding a flow pathway, and an area desired to be fractured. The placing of the composition in the subterranean formation can be any suitable placing and can include any suitable contacting between the subterranean formation and the composition. The placing of the composition in the subterranean formation can include at least partially depositing the composition in a fracture, flow pathway, or area surrounding the same.

In some embodiments, the method includes obtaining or providing the composition including the wrinkled capsules. The obtaining or providing of the composition can occur at any suitable time and at any suitable location. The obtaining or providing of the composition can occur above the surface (e.g., one or more components of the composition can be combined above the surface). The obtaining or providing of the composition can occur in the subterranean formation (e.g., one or more components of the composition can be combined downhole).

The method can include hydraulic fracturing, such as a method of hydraulic fracturing to generate a fracture or flow pathway. The placing of the composition in the subterranean formation or the contacting of the subterranean formation and the hydraulic fracturing can occur at any time with respect to one another; for example, the hydraulic fracturing can occur at least one of before, during, and after the contacting or placing. In some embodiments, the contacting or placing occurs during the hydraulic fracturing, such as during any suitable stage of the hydraulic fracturing, such as during at least one of a pre-pad stage (e.g., during injection of water with no proppant, and additionally optionally mid- to low-strength acid), a pad stage (e.g., during injection of fluid only with no proppant, with some viscosifier, such as to begin to break into an area and initiate fractures to produce sufficient penetration and width to allow proppant-laden later stages to enter), or a slurry stage of the fracturing (e.g., viscous fluid with proppant). The method can include performing a stimulation treatment at least one of before, during, and after placing the composition in the subterranean formation in the fracture, flow pathway, or area surrounding the same. The stimulation treatment can be, for example, at least one of perforating, acidizing, injecting of cleaning fluids, propellant stimulation, and hydraulic fracturing. In some embodiments, the stimulation treatment at least partially generates a fracture or flow pathway where the composition is placed in or contacted to, or the composition is placed in or contacted to an area surrounding the generated fracture or flow pathway.

In various embodiments, the composition including the wrinkled capsules can be an aqueous or oil-based fluid including a drilling fluid, stimulation fluid, fracturing fluid, spotting fluid, clean-up fluid, completion fluid, remedial treatment fluid, abandonment fluid, pill, acidizing fluid, cementing fluid, packer fluid, logging fluid, imaging fluid, or a combination thereof. In various embodiments, the method can include using the composition to perform in the subterranean formation drilling, fracturing, spotting, clean-up, completion, remedial treatment, abandonment, treatment with a pill, acidizing, cementing, packing, logging, imaging, or a combination thereof.

In some embodiments, the method can include using the composition to block pores or flow pathways, which can include using the wrinkled capsules to at least partially block or clog pores or flow pathways. The composition can optionally include other materials aside from the wrinkled capsules that can participate in the blocking of the pores or flowpaths. FIG. 1A illustrates pore clogging with a hard particle. FIGS. 1B-D illustrate pore clogging with various embodiments of wrinkled capsules. FIG. 1E illustrates pore clogging with an embodiment of wrinkled capsules that includes a hard particle therein. In some embodiments, the wrinkled surface of the particle, or the surface of an expanded particle, can provide extra surface area for friction contact with the pore and with other particles.

In some embodiments, the wrinkled capsule can include a cargo in the core. In such embodiments, the method can include releasing the cargo in the subterranean formation. Releasing the cargo can include diffusing the cargo can include diffusing at least part of the cargo from the core through the shell and into the surrounding environment. In some embodiments, releasing the cargo can include breaking the shell, such as forming an orifice in the shell or any suitable size. The releasing can be triggered by conditions in the surrounding environment in the subterranean formation, such as temperature, mechanical deformation (e.g., due to application of compression, pressure, or shear), and surrounding chemical conditions (e.g., pH (e.g., acid, base), solvent type, or chemical reaction with the shell).

Wrinkled Capsules.

The composition includes one or more wrinkled capsule. Each wrinkled capsule includes a hydrophobic core and a wrinkled shell. The wrinkled capsules can form any suitable proportion of the composition, such as about 0.001 wt % to about 100 wt % of the composition, or about 100 wt %, or about 0.001 wt % or less, or equal to, less than, or greater than 0.01 wt %, 0.1, 1, 2, 3, 4, 5, 6, 8, 10, 12, 14, 16, 18, 20, 25, 30, 35, 40, 45, 50, 55, 60, 65, 70, 75, 80, 82, 84, 86, 88, 90, 91, 92, 93, 94, 95, 96, 97, 98, 99, 99.9, 99.99 wt %, or about 99.999 wt % or more.

The wrinkled capsules can have any suitable particle size, wherein for non-spherical particles the particle size is the largest dimension of the particle, and wherein for flexible particles the particle size can refer to the particle size of the relaxed particle that is not being squeezed, such as squeezed through a pore or squeezed by other particles. The wrinkled capsule can have a particle size (e.g., a relaxed particle size, wherein the wrinkled capsule is not being forced through an orifice or pore, or being otherwise compressed) of about 0.1 microns to about 500 microns, about 0.2 microns to about 500 microns, about 1 micron to about 100 microns, or about 0.1 microns or less, or equal to, less than, or greater than 0.1 microns, 0.2, 0.3, 0.4, 0.5, 0.6, 0.7, 0.8, 0.9, 1, 2, 3, 4, 5, 6, 7, 8, 9, 10, 12, 14, 16, 18, 20, 25, 30, 35, 40, 45, 50, 55, 60, 65, 70, 75, 80, 85, 90, 95, 100, 110, 120, 130, 140, 150, 175, 200, 225, 250, 300, 350, 400, 450 microns, or about 500 microns or more. In some embodiments, the wrinkled capsules can have a particle size that is tailored for the specific intended use of the wrinkled capsules. For example, for a circulating mud system, the wrinkled capsules can have a particle size of 25 microns or less. For example, for pore plugging operations, the wrinkled capsules can have a particle size of about the pore size or slightly greater than the pore size, or of about ⅓ of the pore size (e.g., using bridging theory).

In some embodiments, the wrinkled capsule includes cargo in the hydrophobic core. In other embodiments, the wrinkled capsule is free of cargo. The one or more cargos can form any suitable proportion of the core, such as about 0.001 wt % to about 99.99 wt % of the core, or about 10 wt % to about 90 wt % of the core, or about 0.001 wt % or less, or equal to, less than, or greater than about 0.01 wt %, 0.1, 1, 2, 3, 4, 5, 6, 7, 8, 9, 10, 12, 14, 16, 18, 20, 25, 30, 35, 40, 45, 50, 55, 60, 65, 70, 75, 80, 82, 84, 86, 88, 90, 91, 92, 93, 94, 95, 96, 97, 98, 99, 99.9, or about 99.99 wt % or more. The cargo can be any suitable cargo. In various embodiments, the cargo can be a hydrophobic cargo that is miscible or soluble in the hydrophobic medium of the core. In other embodiments, the cargo can be neutral or hydrophilic but can be suitably suspended in the hydrophobic medium of the core such that the shell can be formed around the core and the cargo suspended therein, such as an inorganic particle or a proppant. For example, the cargo can be a blowing agent, a lubricant, a tracer, a dye, a contrast enhancer, an acid, an acid-forming reagent, a base, a base-forming reagent, an amine, a catalyst, a breaker, an inorganic particle, a proppant, a liquid, a gas, a dispersed solid, a multi-phase substance, or a combination thereof. The blowing agent can be a substituted or unsubstituted aliphatic $(C_1\text{-}C_{20})$hydrocarbon, a halogenated $(C_1\text{-}C_{20})$hydrocarbon that is otherwise substituted or unsubstituted, a tetra$(C_1\text{-}C_{10})$alkylsilane, or a combination thereof. The blowing agent can be an unsubstituted aliphatic $(C_1\text{-}C_{20})$hydrocarbon, a halogenated $(C_1\text{-}C_{20})$hydrocarbon that is otherwise unsubstituted, a tetra$(C_1\text{-}C_{10})$alkylsilane, or a combination thereof. The blowing agent can be perfluorohexane (PFH), isopentane (IP), perfluoropentane (PFP), perfluorooctane (PFO), tetramethylsilane (TMS), or a combination thereof.

In various embodiments, the wrinkled capsule can be a long-lasting particles, such as for drilling non-producing zones. In some embodiments, the wrinkled capsule can be degradable, such as for drilling target intervals.

Shell.

The wrinkled capsule includes a shell. The shell can completely cover the surface area of the core. The shell can be at least partially permeable to one or more components of the core (e.g., cargo). The shell can be substantially impermeable to other components of the core. The shell (e.g., the unbroken shell) can be substantially impermeable to all components of the core. The shell can include hydrophobic moieties, hydrophilic moieties, or a combination thereof.

The shell can have any suitable thickness. The shell can have a thickness of about 1 nm to about 10 microns, about 10 nm to about 1 micron, or about 1 nm or less, or less than, equal to, or greater than about 2 nm, 3, 4, 5, 6, 7, 8, 9, 10, 12, 14, 16, 18, 20, 25, 30, 35, 40, 45, 50, 60, 70, 80, 90, 100, 110, 120, 125, 150, 200, 250, 300, 400, 500, 600, 700, 800, 900 nm, 1 micron, 1.5, 2, 2.5, 3, 3.5, 4, 5, 6, 7, 8, 9, or about 10 microns or more.

The shell is a wrinkled shell. The shell can be wrinkled to any suitable degree, from a single dimple in an otherwise smooth sphere to an entirely crumpled structure. The wrinkled shell can include at least one wrinkle, dimple, fold, crease, corrugation, crumple, depression, pucker, ridge, or a combination thereof.

The shell can form any suitable proportion of the wrinkled capsule. For example, the shell can be about 0.001 wt % to about 99.999 wt % of the wrinkled capsule, about 0.001 wt % to about 70 wt %, about 10 wt % to about 60 wt %, or about 0.001 wt % or less, or less than, equal to, or greater than about 0.01 wt %, 0.1, 1, 2, 3, 4, 5, 6, 7, 8, 9, 10, 12, 14, 16, 18, 20, 25, 30, 35, 40, 45, 50, 55, 60, 65, 70, 75, 80, 82, 84, 86, 88, 90, 91, 92, 93, 94, 95, 96, 97, 98, 99, 99.9, 99.99 wt %, or about 99.999 wt % or more. The shell can be about 0.001 vol % to about 99.999 vol % of the wrinkled capsule, about 0.001 vol % to about 70 vol %, about 10 vol % to about 70 vol %, or about 0.001 vol % or less, or about 0.01 vol %, 0.1, 1, 2, 3, 4, 5, 6, 7, 8, 9, 10, 12, 14, 16, 18, 20, 25, 30, 35, 40, 45, 50, 55, 60, 65, 70, 75, 80, 82, 84, 86, 88, 90, 91, 92, 93, 94, 95, 96, 97, 98, 99, 99.9, 99.99 vol %, or about 99.999 vol % or more of the wrinkled capsule.

The shell can include one or more polymers. The one or more polymer can form any suitable proportion of the shell, such as about 50 wt % to about 100 wt % of the shell, or about 50 wt % or less, or less than, equal to, or greater than about 55 wt %, 60, 65, 70, 75, 80, 82, 84, 86, 88, 90, 91, 92, 93, 94, 95, 96, 97, 98, 99, 99.9, 99.99 wt %, or about 99.999 wt % or more of the shell. The one or more polymers can each independently include one or more repeating units formed by polymerization of a substituted or unsubstituted $(C_3-C_{50})$alkenoic acid or a salt or substituted or unsubstituted $(C_1-C_{50})$hydrocarbyl ester thereof, a substituted or unsubstituted $(C_2-C_{50})$alkenylnitrile, a substituted or unsubstituted $(C_2-C_{50})$alkenyl$(C_6-C_{50})$aryl, a halide-substituted $(C_2-C_{50})$alkene wherein the $(C_2-C_{50})$alkene is further substituted or unsubstituted, or a combination thereof (e.g., or copolymers of two or more of the same). The one or more polymers in the shell can include one or more repeating units formed by polymerization of a substituted or unsubstituted acrylic acid or a salt or substituted or unsubstituted $(C_1-C_5)$alkyl ester thereof, a substituted or unsubstituted acrylonitrile, a substituted or unsubstituted styrene, a halide-substituted ethene, or a combination thereof. The one or more polymers in the shell can include one or more repeating units formed by polymerization of hydroxyethyl methacrylate (HEMA), acrylic acid (AA), tert-butyl acrylate (tBA), vinylidene chloride (VDC), acrylonitrile (AN), styrene, methyl methacrylate (MMA), ethyl methacrylate (EMA), methacrylic acid (MAA), or a combination thereof. The one or more polymers in the shell can include a methacrylic acid/styrene copolymer, an acrylonitrile/vinylidene chloride copolymer, an acrylonitrile/acrylic acid copolymer, a methyl methacrylate/acrylonitrile/vinylidene chloride copolymer, or a combination thereof. The one or more polymers in the shell can include one or more repeating units formed by polymerization of hydroxyethyl methacrylate (HEMA), acrylic acid (AA), tert-butyl acrylate (tBA), vinylidene chloride (VDC), acrylonitrile (AN), or a combination thereof. The one or more polymers in the shell can include an acrylonitrile/vinylidene chloride copolymer, an acrylonitrile/acrylic acid copolymer, or a combination thereof.

In various embodiments, the one or more polymers in the shell can be crosslinked (e.g., intramolecularly crosslinked, intermolecularly crosslinked, or a combination thereof). The crosslinking can occur in any suitable way. In some embodiments, the crosslinker is a polyvinyl crosslinker selected from the group consisting of a $(C_1-C_{20})$alkylenebiacrylamide, a poly(($C_1-C_{20}$)alkenyl)-substituted mono- or poly-($C_1$-$C_{20}$)alkyl ether, a poly($C_2-C_{20}$)alkenylbenzene, pentaerythritol triallyl ether, a polyethyleneglycol-diacrylate, polyethyleneglycol-dimethacrylate, N,N'-methylenebisacrylamide, epichlorohydrin, divinyl sulfone, glycidyl methacrylate, an alkyl diacrylate, ethylene glycol diacrylate, ethylene glycol dimethacrylate, polyethylene glycol diacrylate, polyethylene glycol dimethacrylate, ethoxylated bisphenol A diacrylate, ethoxylated bisphenol A dimethacrylate, ethoxylated trimethylol propane triacrylate, ethoxylated trimethylol propane trimethacrylate, ethoxylated glyceryl triacrylate, ethoxylated glyceryl trimethacrylate, ethoxylated pentaerythritol tetraacrylate, ethoxylated pentaerythritol tetramethacrylate, ethoxylated dipentaerythritol hexaacrylate, polyglyceryl monoethylene oxide polyacrylate, polyglyceryl polyethylene glycol polyacrylate, dipentaerythritol hexaacrylate, dipentaerythritol hexamethacrylate, neopentyl glycol diacrylate, neopentyl glycol dimethacrylate, pentaerythritol triacrylate, pentaerythritol trimethacrylate, trimethylol propane triacrylate (TMPTA), trimethylol propane trimethacrylate, tricyclodecane dimethanol diacrylate, tricyclodecane dimethanol dimethacrylate, 1,6-hexanediol diacrylate, 1,6-hexanediol dimethacrylate, and combinations thereof. The polymer can include one polyvinyl crosslinker, or multiple polyvinyl crosslinkers. The one or more polyvinyl crosslinkers can form any suitable mol % of the polymer, such as about 0.001 mol % to about 50 mol %, about 0.001 wt % to about 2.5 wt %, about 0.1 wt % to about 2.0 wt %, about 0.1 wt % to about 1 wt %, or about 0.001 mol % or less, or about 0.01 mol %, 0.1, 1, 2, 3, 4, 5, 6, 8, 10, 12, 14, 16, 18, 20, 25, 30, 35, 40, 45, or about 50 mol % or more. The crosslinker can be about 0.000,01 wt % to about 5 wt % of the monomers used to form the shell of the wrinkled capsule, about 0.001 wt % to about 2.5 wt %, about 0.1 wt % to about 2.0 wt %, about 0.1 wt % to about 1 wt %, or about 0.000,01 wt % or less, or about 0.000,05 wt %, 0.000,1, 0.000,5, 0.001, 0.005, 0.01, 0.05, 0.1, 0.5, 1, 2, 3, 4, or about 5 wt % or more.

The polymer (e.g., not considering inter-polymer crosslinks) can have any suitable molecular weight, such as about 100 to about 20,000,000, or about 1,000 to about 1,000,000, or about 100 or less, or about 200, 300, 500, 750, 1,000, 1,500, 2,000, 2,500, 5,000, 10,000, 15,000, 20,000, 25,000, 50,000, 75,000, 100,000, 150,000, 200,000, 250,000, 500,000, 1,000,000, 2,000,000, 5,000,000, 10,000,000, 15,000,000, or about 20,000,000 or more.

The shell can have any suitable elastic modulus. For example, the shell can have an elastic modulus of about $1 \times 10^3$ Pa to about $1 \times 10^{11}$ Pa, or about $1 \times 10^5$ Pa to about $1 \times 10^9$ Pa, or about $1 \times 10^3$ Pa or less, or less than, equal to, or greater than about $1 \times 10^4$ Pa, $1 \times 10^5$ Pa, $1 \times 10^6$ Pa, $1 \times 10^7$ Pa, $1 \times 10^8$ Pa, or about $1 \times 10^9$ Pa or more.

The shell can have any suitable degree of wrinkledness (W), which can refer to the shell-cross section perimeter divided by the circular circumference that fits around the shell-cross section (e.g., the predicted best-fit sphere from a cross-section measured by FIB, wherein the sphere radius is determined as an average distance from the geometrical center to the perimeter line), such as about 1 to about 10,000, or about 1.01 to about 100, or about 1.01 or less, or less than, equal to, or greater than about 1.2, 1.4, 1.6, 1.8, 2, 2.2, 2.4, 2.6, 2.8, 3, 3.2, 3.4, 3.6, 3.8, 4, 4.5, 5, 5.5, 6, 6.5, 7, 7.5, 8, 8.5, 9, 9.5, 10, 11, 12, 13, 14, 15, 16, 18, 20, 25, 50, 75, 100, 150, 200, 250, 300, 400, 500, 750, 1,000, 1,250, 1,500, 2,000, 2,500, 5,000, 7,500, or about 10,000 or more.

Hydrophobic Core.

The wrinkled capsule includes a hydrophobic core. The core can form any suitable proportion of the wrinkled capsule, such as about 0.001 wt % to about 99.999 wt % of the wrinkled capsule, about 5 wt % to about 99.999 wt %, about 10 wt % to about 99.999 wt %, about 15 wt % to about 99.999 wt %, about 30 wt % to about 99.999 wt %, about 0.001 wt % or less, or less than, equal to, or more than about 0.01 wt %, 0.1, 1, 2, 3, 4, 5, 6, 7, 8, 9, 10, 11, 12, 13, 14, 15, 16, 17, 18, 19, 20, 22, 24, 26, 28, 30, 35, 40, 45, 50, 55, 60, 65, 70, 75, 80, 82, 84, 86, 88, 90, 91, 92, 93, 94, 95, 96, 97, 98, 99, 99.9, 99.99 wt %, or about 99.999 wt %. The core can be about 0.001 vol % to about 99.999 vol % of the wrinkled capsule, about 5 vol % to about 99.999 vol %, about 10 vol % to about 99.999 vol %, about 15 vol % to about 99.999 vol %, about 30 vol % to about 99.999, about 40 vol % to about 90 vol %, or about 0.001 vol % or less, or less than, equal to, or more than about 0.01 vol %, 0.1, 1, 2, 3, 4, 5, 6, 7, 8, 9, 10, 11, 12, 13, 14, 15, 16, 17, 18, 19, 20, 22, 24, 26, 28, 30, 35, 40, 45, 50, 55, 60, 65, 70, 75, 80, 82, 84, 86, 88, 90, 91, 92, 93, 94, 95, 96, 97, 98, 99, 99.9, 99.99 vol %, or about 99.999 vol % or more.

The core can be considered a hydrophobic core by virtue of a hydrophobic medium in the core. The core can be overall hydrophobic or hydrophilic, so long as some amount of the hydrophobic medium used to form the core remains in the core. The hydrophobic core can be a mixture of different materials, at least one of which is hydrophobic. Optionally, some of the components of the hydrophobic core can be hydrophilic; in some embodiments, none of the components of the hydrophobic core are hydrophilic. The wrinkled capsules can be generated by forming the shell around droplets of hydrophobic medium (which can optionally include one or more hydrophilic components) suspended in an aqueous solution, wherein the droplets of hydrophobic medium can include other materials such as cargo, initiator, and crosslinker. The hydrophobic medium can be any suitable hydrophobic medium, such as an oil, an organic solvent (e.g., a hydrophobic organic solvent such as a substituted or unsubstituted ($C_5$-$C_{50}$)hydrocarbon, such as n-decane), or a combination thereof. The hydrophobic medium can form any suitable proportion of the core, such as about 0.01 wt % to about 100 wt % of the core, about 10 wt % to about 90 wt %, or about 0.01 wt % or less, or less than, equal to, or greater than about 0.1 wt %, 1, 2, 3, 4, 5, 6, 7, 8, 9, 10, 12, 14, 16, 18, 20, 25, 30, 35, 40, 45, 50, 55, 60, 65, 70, 75, 80, 82, 84, 86, 88, 90, 91, 92, 93, 94, 95, 96, 97, 98, 99, 99.9, 99.99 wt %, or 99.999 wt % or more.

Other Components.

The wrinkled capsule (e.g., the core, the shell, or a combination thereof), the composition including the wrinkled capsules, or a mixture including the composition, can include any suitable additional component in any suitable proportion, such that the wrinkled capsule, composition, or mixture including the same, can be used as described herein. Any component listed in this section can be present or not present in the composition or a mixture including the same.

In some embodiments, the wrinkled capsule (e.g., the core, the shell, or a combination thereof), the composition including the wrinkled capsules, or a mixture including the composition, includes one or more viscosifiers. The viscosifier can be any suitable viscosifier. The viscosifier can affect the viscosity of the composition or a solvent that contacts the composition at any suitable time and location. In some embodiments, the viscosifier provides an increased viscosity at least one of before injection into the subterranean formation, at the time of injection into the subterranean formation, during travel through a tubular disposed in a borehole, once the composition reaches a particular subterranean location, or some period of time after the composition reaches a particular subterranean location. In some embodiments, the viscosifier can be about 0.000,1 wt % to about 10 wt % of the wrinkled capsule (e.g., the core, the shell, or a combination thereof), the composition including the wrinkled capsules, or a mixture including the composition, about 0.004 wt % to about 0.01 wt %, or about 0.000,1 wt % or less, 0.000,5 wt %, 0.001, 0.005, 0.01, 0.05, 0.1, 0.5, 1, 2, 3, 4, 5, 6, 7, 8, 9, or about 10 wt % or more of the composition or a mixture including the same.

The viscosifier can include at least one of a substituted or unsubstituted polysaccharide, and a substituted or unsubstituted polyalkene (e.g., a polyethylene, wherein the ethylene unit is substituted or unsubstituted, derived from the corresponding substituted or unsubstituted ethene), wherein the polysaccharide or polyalkene is crosslinked or uncrosslinked. The viscosifier can include a polymer including at least one repeating unit derived from a monomer selected from the group consisting of ethylene glycol, acrylamide, vinyl acetate, 2-acrylamidomethylpropane sulfonic acid or its salts, trimethylammoniumethyl acrylate halide, and trimethylammoniumethyl methacrylate halide. The viscosifier can include a crosslinked gel or a crosslinkable gel. The viscosifier can include at least one of a linear polysaccharide, and a poly(($C_2$-$C_{10}$)alkene), wherein the ($C_2$-$C_{10}$) alkene is substituted or unsubstituted. The viscosifier can include at least one of poly(acrylic acid) or ($C_1$-$C_5$)alkyl esters thereof, poly(methacrylic acid) or ($C_1$-$C_5$)alkyl esters thereof, poly(vinyl acetate), poly(vinyl alcohol), poly(ethylene glycol), poly(vinyl pyrrolidone), polyacrylamide, poly(hydroxyethyl methacrylate), alginate, chitosan, curdlan, dextran, derivatized dextran, emulsan, a galactoglucopolysaccharide, gellan, glucuronan, N-acetyl-glucosamine, N-acetyl-heparosan, hyaluronic acid, kefiran, lentinan, levan, mauran, pullulan, scleroglucan, schizophyllan, stewartan, succinoglycan, xanthan, diutan, welan, starch, derivatized starch, tamarind, tragacanth, guar gum, derivatized guar gum (e.g., hydroxypropyl guar, carboxy methyl guar, or carboxymethyl hydroxypropyl guar), gum ghatti, gum arabic, locust bean gum, karaya gum, cellulose, and derivatized cellulose (e.g., carboxymethyl cellulose, hydroxyethyl cellulose, carboxymethyl hydroxyethyl cellulose, hydroxypropyl cellulose, or methyl hydroxy ethyl cellulose).

In some embodiments, the viscosifier can include at least one of a poly(vinyl alcohol) homopolymer, poly(vinyl alcohol) copolymer, a crosslinked poly(vinyl alcohol) homopolymer, and a crosslinked poly(vinyl alcohol) copolymer. The viscosifier can include a poly(vinyl alcohol) copolymer or a crosslinked poly(vinyl alcohol) copolymer including at least one of a graft, linear, branched, block, and random copolymer of vinyl alcohol and at least one of a substituted or unsubstituted ($C_2$-$C_{50}$)hydrocarbyl having at least one aliphatic unsaturated C—C bond therein, and a substituted or unsubstituted ($C_2$-$C_{50}$)alkene. The viscosifier can include a poly(vinyl alcohol) copolymer or a crosslinked poly(vinyl alcohol) copolymer including at least one of a graft, linear, branched, block, and random copolymer of vinyl alcohol and at least one of vinyl phosphonic acid, vinylidene diphosphonic acid, substituted or unsubstituted 2-acrylamido-2-methylpropanesulfonic acid, a substituted or unsubstituted ($C_1$-$C_{20}$)alkenoic acid, propenoic acid, butenoic acid, pentenoic acid, hexenoic acid, octenoic acid, nonenoic acid, decenoic acid, acrylic acid, methacrylic acid, hydroxypropyl acrylic acid, acrylamide, fumaric acid, methacrylic acid, hydroxypropyl acrylic acid, vinyl phosphonic acid, vinylidene diphosphonic acid, itaconic acid, crotonic acid, mesoconic acid, citraconic acid, styrene sulfonic acid, allyl sulfonic acid, methallyl sulfonic acid, vinyl sulfonic acid, and a substituted or unsubstituted $(C_1-C_{20})$alkyl ester thereof. The viscosifier can include a poly(vinyl alcohol) copolymer or a crosslinked poly(vinyl alcohol) copolymer including at least one of a graft, linear, branched, block, and random copolymer of vinyl alcohol and at least one of vinyl acetate, vinyl propanoate, vinyl butanoate, vinyl pentanoate, vinyl hexanoate, vinyl 2-methyl butanoate, vinyl 3-ethyl-pentanoate, vinyl 3-ethylhexanoate, maleic anhydride, a substituted or unsubstituted $(C_1-C_{20})$alkenoic substituted or unsubstituted $(C_1-C_{20})$alkanoic anhydride, a substituted or unsubstituted $(C_1-C_{20})$alkenoic substituted or unsubstituted $(C_1-C_{20})$alkenoic anhydride, propenoic acid anhydride, butenoic acid anhydride, pentenoic acid anhydride, hexenoic acid anhydride, octenoic acid anhydride, nonenoic acid anhydride, decenoic acid anhydride, acrylic acid anhydride, fumaric acid anhydride, methacrylic acid anhydride, hydroxypropyl acrylic acid anhydride, vinyl phosphonic acid anhydride, vinylidene diphosphonic acid anhydride, itaconic acid anhydride, crotonic acid anhydride, mesoconic acid anhydride, citraconic acid anhydride, styrene sulfonic acid anhydride, allyl sulfonic acid anhydride, methallyl sulfonic acid anhydride, vinyl sulfonic acid anhydride, and an N—$(C_1-C_{10})$alkenyl nitrogen-containing substituted or unsubstituted $(C_1-C_{10})$heterocycle. The viscosifier can include a poly(vinyl alcohol) copolymer or a crosslinked poly(vinyl alcohol) copolymer including at least one of a graft, linear, branched, block, and random copolymer that includes a poly(vinylalcohol/acrylamide) copolymer, a poly (vinylalcohol/2-acrylamido-2-methylpropanesulfonic acid) copolymer, a poly (acrylamide/2-acrylamido-2-methylpropanesulfonic acid) copolymer, or a poly(vinylalcohol/N-vinylpyrrolidone) copolymer. The viscosifier can include a crosslinked poly(vinyl alcohol) homopolymer or copolymer including a crosslinker including at least one of chromium, aluminum, antimony, zirconium, titanium, calcium, boron, iron, silicon, copper, zinc, magnesium, and an ion thereof. The viscosifier can include a crosslinked poly(vinyl alcohol) homopolymer or copolymer including a crosslinker including at least one of an aldehyde, an aldehyde-forming compound, a carboxylic acid or an ester thereof, a sulfonic acid or an ester thereof, a phosphonic acid or an ester thereof, an acid anhydride, and an epihalohydrin.

In various embodiments, the wrinkled capsule (e.g., the core, the shell, or a combination thereof), the composition including the wrinkled capsules, or a mixture including the composition, can include one or more crosslinkers. The crosslinker can be any suitable crosslinker. In some examples, the crosslinker can be incorporated in a crosslinked viscosifier, and in other examples, the crosslinker can crosslink a crosslinkable material (e.g., downhole). The crosslinker can include at least one of chromium, aluminum, antimony, zirconium, titanium, calcium, boron, iron, silicon, copper, zinc, magnesium, and an ion thereof. The crosslinker can include at least one of boric acid, borax, a borate, a $(C_1-C_{30})$hydrocarbylboronic acid, a $(C_1-C_{30})$hydrocarbyl ester of a $(C_1-C_{30})$hydrocarbylboronic acid, a $(C_1-C_{30})$hydrocarbylboronic acid-modified polyacrylamide, ferric chloride, disodium octaborate tetrahydrate, sodium metaborate, sodium diborate, sodium tetraborate, disodium tetraborate, a pentaborate, ulexite, colemanite, magnesium oxide, zirconium lactate, zirconium triethanol amine, zirconium carbonate, zirconium acetylacetonate, zirconium malate, zirconium citrate, zirconium diisopropylamine lactate, zirconium glycolate, zirconium triethanol amine glycolate, zirconium lactate glycolate, titanium lactate, titanium malate, titanium citrate, titanium ammonium lactate, titanium triethanolamine, titanium acetylacetonate, aluminum lactate, and aluminum citrate. In some embodiments, the crosslinker can be a $(C_1-C_{20})$alkylenebiacrylamide (e.g., methylenebisacrylamide), a poly $((C_1-C_{20})$alkenyl)-substituted mono- or poly-$(C_1-C_{20})$alkyl ether (e.g., pentaerythritol allyl ether), and a poly$(C_2-C_{20})$ alkenylbenzene (e.g., divinylbenzene). In some embodiments, the crosslinker can be at least one of alkyl diacrylate, ethylene glycol diacrylate, ethylene glycol dimethacrylate, polyethylene glycol diacrylate, polyethylene glycol dimethacrylate, ethoxylated bisphenol A diacrylate, ethoxylated bisphenol A dimethacrylate, ethoxylated trimethylol propane triacrylate, ethoxylated trimethylol propane trimethacrylate, ethoxylated glyceryl triacrylate, ethoxylated glyceryl trimethacrylate, ethoxylated pentaerythritol tetraacrylate, ethoxylated pentaerythritol tetramethacrylate, ethoxylated dipentaerythritol hexaacrylate, polyglyceryl monoethylene oxide polyacrylate, polyglyceryl polyethylene glycol polyacrylate, dipentaerythritol hexaacrylate, dipentaerythritol hexamethacrylate, neopentyl glycol diacrylate, neopentyl glycol dimethacrylate, pentaerythritol triacrylate, pentaerythritol trimethacrylate, trimethylol propane triacrylate, trimethylol propane trimethacrylate, tricyclodecane dimethanol diacrylate, tricyclodecane dimethanol dimethacrylate, 1,6-hexanediol diacrylate, and 1,6-hexanediol dimethacrylate. The crosslinker can be about 0.000,01 wt % to about 5 wt % of the wrinkled capsule (e.g., the core, the shell, or a combination thereof), the composition including the wrinkled capsules, or a mixture including the composition, about 0.001 wt % to about 5 wt %, about 0.001 wt % to about 2.5 wt %, about 0.1 wt % to about 1 wt %, or about 0.000,01 wt % or less, or about 0.000,05 wt %, 0.000,1, 0.000,5, 0.001, 0.005, 0.01, 0.05, 0.1, 0.5, 1, 2, 3, 4, or about 5 wt % or more.

In some embodiments, the wrinkled capsule (e.g., the core, the shell, or a combination thereof), the composition including the wrinkled capsules, or a mixture including the composition, can include one or more breakers. The breaker can be any suitable breaker, such that the surrounding fluid (e.g., a fracturing fluid) can be at least partially broken for more complete and more efficient recovery thereof, such as at the conclusion of the hydraulic fracturing treatment. In some embodiments, the breaker can be encapsulated or otherwise formulated to give a delayed-release or a time-release of the breaker, such that the surrounding liquid can remain viscous for a suitable amount of time prior to breaking. The breaker can be any suitable breaker; for example, the breaker can be a compound that includes at least one of a $Na^+$, $K^+$, $Zn^+$, $NH_4^+$, $Fe^{2+}$, $Fe^{3+}$, $Cu^+$, $Cu^{2+}$, $Ca^{2+}$, $Mg^{2+}$, $Zn^{2+}$, and an $Al^{3+}$ salt of a chloride, fluoride, bromide, phosphate, or sulfate ion. In some examples, the breaker can be an oxidative breaker or an enzymatic breaker. An oxidative breaker can be at least one of a $Na^+$, $K^+$, $Li^+$, $Zn^+$, $NH_4^+$, $Fe^{2+}$, $Fe^{3+}$, $Cu^{2+}$, $Ca^{2+}$, $Mg^{2+}$, $Zn^{2+}$, and an $Al^{3+}$ salt of a persulfate, percarbonate, perborate, peroxide, perphosphonate, permanganate, chlorite, or hypochlorite ion. An enzymatic breaker can be at least one of an alpha or beta amylase, amyloglucosidase, oligoglucosidase, invertase, maltase, cellulase, hemi-cellulase, and mannanohydrolase. The breaker can be about 0.001 wt % to about 30 wt % of the wrinkled capsule (e.g., the core, the shell, or a combination thereof), the composition including the wrinkled capsules, or a mixture including the composition, or about 0.01 wt % to about 5 wt %, or about 0.001 wt % or less, or about 0.005 wt %, 0.01, 0.05, 0.1, 0.5, 1, 2, 3, 4, 5, 6, 8, 10, 12, 14, 16, 18, 20, 22, 24, 26, 28, or about 30 wt % or more.

The wrinkled capsule (e.g., the core, the shell, or a combination thereof), the composition including the wrinkled capsules, or a mixture including the composition, can include any suitable fluid. For example, the fluid can be at least one of aliphatic hydrocarbons, perfluorocarbons, chlorofluorocarbons, tetraalkyl silanes, silicon-organic fluids, phorphous-organic fluids, crude oil, dipropylene glycol methyl ether, dipropylene glycol dimethyl ether, dipropylene glycol methyl ether, dipropylene glycol dimethyl ether, dimethyl formamide, diethylene glycol methyl ether, ethylene glycol butyl ether, diethylene glycol butyl ether, butylglycidyl ether, propylene carbonate, D-limonene, a $C_2$-$C_{40}$ fatty acid $C_1$-$C_{10}$ alkyl ester (e.g., a fatty acid methyl ester), tetrahydrofurfuryl methacrylate, tetrahydrofurfuryl acrylate, 2-butoxy ethanol, butyl acetate, butyl lactate, furfuryl acetate, dimethyl sulfoxide, dimethyl formamide, a petroleum distillation product of fraction (e.g., diesel, kerosene, napthas, and the like) mineral oil, a hydrocarbon oil, a hydrocarbon including an aromatic carbon-carbon bond (e.g., benzene, toluene), a hydrocarbon including an alpha olefin, xylenes, an ionic liquid, methyl ethyl ketone, an ester of oxalic, maleic or succinic acid, methanol, ethanol, propanol (iso- or normal-), butyl alcohol (iso-, tert-, or normal-), an aliphatic hydrocarbon (e.g., cyclohexanone, hexane), water, brine, produced water, flowback water, brackish water, and sea water. The fluid can form about 0.001 wt % to about 99.999 wt % of the wrinkled capsule (e.g., the core, the shell, or a combination thereof), the composition including the wrinkled capsules, or a mixture including the composition, or about 0.001 wt % or less, 0.01 wt %, 0.1, 1, 2, 3, 4, 5, 6, 8, 10, 15, 20, 25, 30, 35, 40, 45, 50, 55, 60, 65, 70, 75, 80, 85, 90, 95, 96, 97, 98, 99, 99.9, 99.99, or about 99.999 wt % or more.

The composition including the wrinkled capsules or a mixture including the same can include any suitable downhole fluid. The composition including the wrinkled capsules can be combined with any suitable downhole fluid before, during, or after the placement of the composition in the subterranean formation or the contacting of the composition and the subterranean material. In some examples, the composition including the wrinkled capsules is combined with a downhole fluid above the surface, and then the combined composition is placed in a subterranean formation or contacted with a subterranean material. In another example, the composition including the wrinkled capsules is injected into a subterranean formation to combine with a downhole fluid, and the combined composition is contacted with a subterranean material or is considered to be placed in the subterranean formation. The placement of the composition in the subterranean formation can include contacting the subterranean material and the mixture. Any suitable weight percent of the composition or of a mixture including the same that is placed in the subterranean formation or contacted with the subterranean material can be the downhole fluid, such as about 0.001 wt % to about 99.999 wt %, about 0.01 wt % to about 99.99 wt %, about 0.1 wt % to about 99.9 wt %, about 20 wt % to about 90 wt %, or about 0.001 wt % or less, or about 0.01 wt %, 0.1, 1, 2, 3, 4, 5, 10, 15, 20, 30, 40, 50, 60, 70, 80, 85, 90, 91, 92, 93, 94, 95, 96, 97, 98, 99, 99.9, 99.99 wt %, or about 99.999 wt % or more of the composition or mixture including the same.

In some embodiments, the wrinkled capsule (e.g., the core, the shell, or a combination thereof), the composition including the wrinkled capsules, or a mixture including the composition, can include any suitable amount of any suitable material used in a downhole fluid. For example, the wrinkled capsule (e.g., the core, the shell, or a combination thereof), the composition including the wrinkled capsules, or a mixture including the composition, can include water, saline, aqueous base, acid, oil, organic solvent, synthetic fluid oil phase, aqueous solution, alcohol or polyol, cellulose, starch, alkalinity control agents, acidity control agents, density control agents, density modifiers, emulsifiers, dispersants, polymeric stabilizers, polyacrylamide, a polymer or combination of polymers, antioxidants, heat stabilizers, foam control agents, solvents, diluents, plasticizer, filler or inorganic particle, pigment, dye, precipitating agent, oil-wetting agents, set retarding additives, surfactants, gases, weight reducing additives, heavy-weight additives, lost circulation materials, filtration control additives, salts (e.g., any suitable salt, such as potassium salts such as potassium chloride, potassium bromide, potassium formate; calcium salts such as calcium chloride, calcium bromide, calcium formate; cesium salts such as cesium chloride, cesium bromide, cesium formate, or a combination thereof), fibers, thixotropic additives, breakers, crosslinkers, rheology modifiers, curing accelerators, curing retarders, pH modifiers, chelating agents, scale inhibitors, enzymes, resins, water control materials, oxidizers, markers, Portland cement, pozzolana cement, gypsum cement, high alumina content cement, slag cement, silica cement, fly ash, metakaolin, shale, zeolite, a crystalline silica compound, amorphous silica, hydratable clays, microspheres, lime, or a combination thereof. In various embodiments, the wrinkled capsule (e.g., the core, the shell, or a combination thereof), the composition including the wrinkled capsules, or a mixture including the composition, can include one or more additive components such as: COLDTROL®, ATC®, OMC 2™, and OMC 42™ thinner additives; RHEMOD™ viscosifier and suspension agent; TEMPERUS™ and VIS-PLUS® additives for providing temporary increased viscosity; TAU-MOD™ viscosifying/suspension agent; ADAPTA®, DURATONE® HT, THERMO TONE™, BDF™-366, and BDF™-454 filtration control agents; LIQUITONE™ polymeric filtration agent and viscosifier; FACTANT™ emulsion stabilizer; LE SUPERMUL™, EZ MUL® NT, and FORTI-MUL® emulsifiers; DRIL TREAT® oil wetting agent for heavy fluids; AQUATONE-S™ wetting agent; BARACARB® bridging agent; BAROID® weighting agent; BAROLIFT® hole sweeping agent; SWEEP-WATE® sweep weighting agent; BDF-508 rheology modifier; and GELTONE® II organophilic clay. In various embodiments, the wrinkled capsule (e.g., the core, the shell, or a combination thereof), the composition including the wrinkled capsules, or a mixture including the composition, can include one or more additive components such as: X-TEND® II, PAC™-R, PAC™-L, LIQUI-VIS® EP, BRINEDRIL-VIS™, BARAZAN®, N-VIS®, and AQUA-GEL® viscosifiers; THERMA-CHEK®, N-DRIL™, N-DRIL™ HT PLUS, IMPERMEX®, FILTERCHEK™, DEXTRID®, CARBONOX®, and BARANEX® filtration control agents; PERFORMATROL®, GEM™, EZ-MUD®, CLAY GRABBER®, CLAYSEAL®, CRYSTAL-DRIL®, and CLAY SYNC™ II shale stabilizers; NXS-LUBE™, EP MUDLUBE®, and DRIL-N-SLIDE™ lubricants; QUIK-THIN®, IRON-THIN™, THERMA-THIN®, and ENVIRO-THIN™ thinners; SOURSCAV™ scavenger; BARACOR® corrosion inhibitor; and WALL-NUT®, SWEEP-WATE®, STOPPIT™, PLUG-GIT®, BARAC-ARB®, DUO-SQUEEZE®, BAROFIBRE™, STEEL-SEAL®, and HYDRO-PLUG® lost circulation management materials. Any suitable proportion of the wrinkled capsule (e.g., the core, the shell, or a combination thereof), the composition including the wrinkled capsules, or a mixture including the composition, can include any optional component listed in this paragraph, such as about 0.001 wt % to about 99.999 wt %, about 0.01 wt % to about 99.99 wt %, about 0.1 wt % to about 99.9 wt %, about 20 to about 90 wt %, or about 0.001 wt % or less, or about 0.01 wt %, 0.1, 1, 2, 3, 4, 5, 10, 15, 20, 30, 40, 50, 60, 70, 80, 85, 90, 91, 92, 93, 94, 95, 96, 97, 98, 99, 99.9, 99.99 wt %, or about 99.999 wt % or more.

A drilling fluid, also known as a drilling mud or simply "mud," is a specially designed fluid that is circulated through a wellbore as the wellbore is being drilled to facilitate the drilling operation. The drilling fluid can be water-based or oil-based. The drilling fluid can carry cuttings up from beneath and around the bit, transport them up the annulus, and allow their separation. Also, a drilling fluid can cool and lubricate the drill bit as well as reduce friction between the drill string and the sides of the hole. The drilling fluid aids in support of the drill pipe and drill bit, and provides a hydrostatic head to maintain the integrity of the wellbore walls and prevent well blowouts. Specific drilling fluid systems can be selected to optimize a drilling operation in accordance with the characteristics of a particular geological formation. The drilling fluid can be formulated to prevent unwanted influxes of formation fluids from permeable rocks and also to form a thin, low permeability filter cake that temporarily seals pores, other openings, and formations penetrated by the bit. In water-based drilling fluids, solid particles are suspended in a water or brine solution containing other components. Oils or other non-aqueous liquids can be emulsified in the water or brine or at least partially solubilized (for less hydrophobic non-aqueous liquids), but water is the continuous phase. A drilling fluid can be present in the wrinkled capsule (e.g., the core, the shell, or a combination thereof), the composition including the wrinkled capsules, or a mixture including the composition, in any suitable amount, such as about 1 wt % or less, about 2 wt %, 3, 4, 5, 10, 15, 20, 30, 40, 50, 60, 70, 80, 85, 90, 95, 96, 97, 98, 99, 99.9, 99.99, or about 99.999 wt % or more.

A water-based drilling fluid in embodiments of the present invention can be any suitable water-based drilling fluid. In various embodiments, the drilling fluid can include at least one of water (fresh or brine), a salt (e.g., calcium chloride, sodium chloride, potassium chloride, magnesium chloride, calcium bromide, sodium bromide, potassium bromide, calcium nitrate, sodium formate, potassium formate, cesium formate), aqueous base (e.g., sodium hydroxide or potassium hydroxide), alcohol or polyol, cellulose, starches, alkalinity control agents, density control agents such as a density modifier (e.g., barium sulfate), surfactants (e.g., betaines, alkali metal alkylene acetates, sultaines, ether carboxylates), emulsifiers, dispersants, polymeric stabilizers, crosslinking agents, polyacrylamides, polymers or combinations of polymers, antioxidants, heat stabilizers, foam control agents, solvents, diluents, plasticizers, filler or inorganic particles (e.g., silica), pigments, dyes, precipitating agents (e.g., silicates or aluminum complexes), and rheology modifiers such as thickeners or viscosifiers (e.g., xanthan gum). Any ingredient listed in this paragraph can be either present or not present in the mixture.

An oil-based drilling fluid or mud in embodiments of the present invention can be any suitable oil-based drilling fluid. In various embodiments the drilling fluid can include at least one of an oil-based fluid (or synthetic fluid), saline, aqueous solution, emulsifiers, other agents or additives for suspension control, weight or density control, oil-wetting agents, fluid loss or filtration control agents, and rheology control agents. An oil-based or invert emulsion-based drilling fluid can include between about 10:90 to about 95:5, or about 50:50 to about 95:5, by volume of oil phase to water phase. A substantially all oil mud includes about 100% liquid phase oil by volume (e.g., substantially no internal aqueous phase).

A pill is a relatively small quantity (e.g., less than about 500 bbl, or less than about 200 bbl) of drilling fluid used to accomplish a specific task that the regular drilling fluid cannot perform. For example, a pill can be a high-viscosity pill to, for example, help lift cuttings out of a vertical wellbore. In another example, a pill can be a freshwater pill to, for example, dissolve a salt formation. Another example is a pipe-freeing pill to, for example, destroy filter cake and relieve differential sticking forces. In another example, a pill is a lost circulation material pill to, for example, plug a thief zone. A pill can include any component described herein as a component of a drilling fluid.

A cement fluid can include an aqueous mixture of at least one of cement and cement kiln dust. The wrinkled capsule (e.g., the core, the shell, or a combination thereof), the composition including the wrinkled capsules, or a mixture including the composition, can include cement, cement kiln dust, or a component thereof. The cement kiln dust can be any suitable cement kiln dust. Cement kiln dust can be formed during the manufacture of cement and can be partially calcined kiln feed that is removed from the gas stream and collected in a dust collector during a manufacturing process. Cement kiln dust can be advantageously utilized in a cost-effective manner since kiln dust is often regarded as a low value waste product of the cement industry. Some embodiments of the cement fluid can include cement kiln dust but no cement, cement kiln dust and cement, or cement but no cement kiln dust. The cement can be any suitable cement. The cement can be a hydraulic cement. A variety of cements can be utilized in accordance with embodiments of the present invention; for example, those including calcium, aluminum, silicon, oxygen, iron, or sulfur, which can set and harden by reaction with water. Suitable cements can include Portland cements, pozzolana cements, gypsum cements, high alumina content cements, slag cements, silica cements, and combinations thereof. In some embodiments, the Portland cements that are suitable for use in embodiments of the present invention are classified as Classes A, C, H, and G cements according to the American Petroleum Institute, *API Specification for Materials and Testing for Well Cements*, API Specification 10, Fifth Ed., Jul. 1, 1990. A cement can be generally included in the cementing fluid in an amount sufficient to provide the desired compressive strength, density, or cost. In some embodiments, the hydraulic cement can be present in the cementing fluid in an amount in the range of from 0 wt % to about 100 wt %, about 0 wt % to about 95 wt %, about 20 wt % to about 95 wt %, or about 50 wt % to about 90 wt %. A cement kiln dust can be present in an amount of at least about 0.01 wt %, or about 5 wt % to about 80 wt %, or about 10 wt % to about 50 wt %.

Any optional ingredient listed in this paragraph can be either present or not present in the wrinkled capsule (e.g., the core, the shell, or a combination thereof), the composition including the wrinkled capsules, or a mixture including the composition: fly ash, metakaolin, shale, zeolite, set retarding additive, surfactant, a gas, accelerators, weight reducing additives, heavy-weight additives, lost circulation materials, filtration control additives, dispersants, and combinations thereof. In some examples, additives can include crystalline silica compounds, amorphous silica, salts, fibers, hydratable clays, microspheres, pozzolan lime, thixotropic additives, combinations thereof, and the like.

In various embodiments, the composition or mixture can include a proppant, a resin-coated proppant, an encapsulated resin, or a combination thereof. A proppant is a material that keeps an induced hydraulic fracture at least partially open during or after a fracturing treatment. Proppants can be transported into the subterranean formation (e.g., downhole) to the fracture using fluid, such as fracturing fluid or another fluid. A higher-viscosity fluid can more effectively transport proppants to a desired location in a fracture, especially larger proppants, by more effectively keeping proppants in a suspended state within the fluid. Examples of proppants can include sand, gravel, glass beads, polymer beads, ground products from shells and seeds such as walnut hulls, and manmade materials such as ceramic proppant, bauxite, tetrafluoroethylene materials (e.g., TEFLON™ polytetrafluoroethylene), fruit pit materials, processed wood, composite particulates prepared from a binder and fine grade particulates such as silica, alumina, fumed silica, carbon black, graphite, mica, titanium dioxide, meta-silicate, calcium silicate, kaolin, talc, zirconia, boron, fly ash, hollow glass microspheres, and solid glass, or mixtures thereof. In some embodiments, the proppant can have an average particle size, wherein particle size is the largest dimension of a particle, of about 0.001 mm to about 3 mm, about 0.15 mm to about 2.5 mm, about 0.25 mm to about 0.43 mm, about 0.43 mm to about 0.85 mm, about 0.85 mm to about 1.18 mm, about 1.18 mm to about 1.70 mm, or about 1.70 to about 2.36 mm. In some embodiments, the proppant can have a distribution of particle sizes clustering around multiple averages, such as one, two, three, or four different average particle sizes. The composition or mixture can include any suitable amount of proppant, such as about 0.01 wt % to about 99.99 wt %, about 0.1 wt % to about 80 wt %, about 10 wt % to about 60 wt %, or about 0.01 wt % or less, or about 0.1 wt %, 1, 2, 3, 4, 5, 10, 15, 20, 30, 40, 50, 60, 70, 80, 85, 90, 91, 92, 93, 94, 95, 96, 97, 98, 99, about 99.9 wt %, or about 99.99 wt % or more.

Drilling Assembly.

Figure 2:
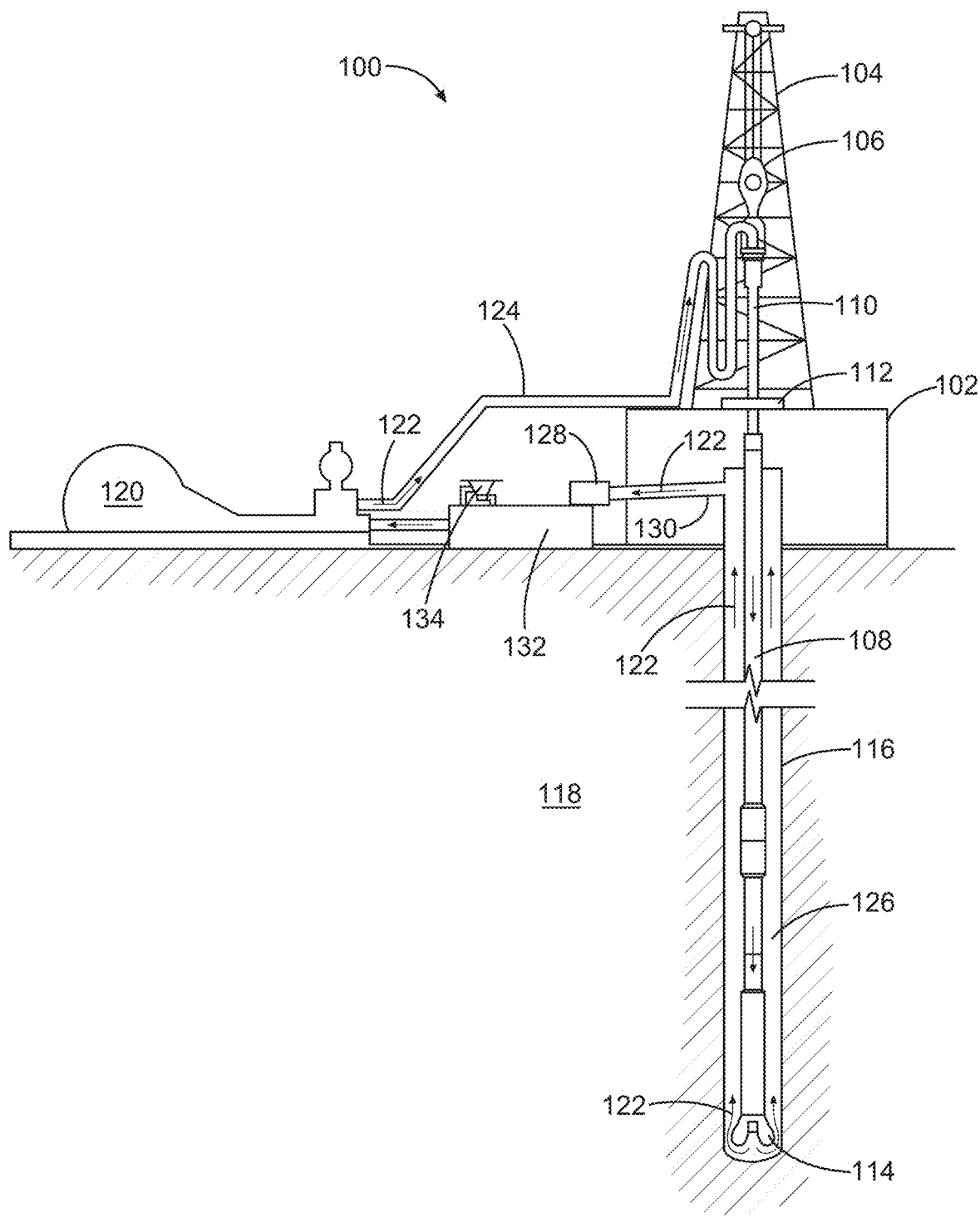
FIG. 2 illustrates a drilling assembly, in accordance with various embodiments.

In various embodiments, the composition including wrinkled capsules disclosed herein can directly or indirectly affect one or more components or pieces of equipment associated with the preparation, delivery, recapture, recycling, reuse, and/or disposal of the disclosed composition including wrinkled capsules. For example, and with reference to FIG. 2, the disclosed composition including wrinkled capsules can directly or indirectly affect one or more components or pieces of equipment associated with an exemplary wellbore drilling assembly 100, according to one or more embodiments. It should be noted that while FIG. 2 generally depicts a land-based drilling assembly, those skilled in the art will readily recognize that the principles described herein are equally applicable to subsea drilling operations that employ floating or sea-based platforms and rigs, without departing from the scope of the disclosure.

As illustrated, the drilling assembly 100 can include a drilling platform 102 that supports a derrick 104 having a traveling block 106 for raising and lowering a drill string 108. The drill string 108 can include drill pipe and coiled tubing, as generally known to those skilled in the art. A kelly 110 supports the drill string 108 as it is lowered through a rotary table 112. A drill bit 114 is attached to the distal end of the drill string 108 and is driven either by a downhole motor and/or via rotation of the drill string 108 from the well surface. As the bit 114 rotates, it creates a wellbore 116 that penetrates various subterranean formations 118.

A pump 120 (e.g., a mud pump) circulates drilling fluid 122 through a feed pipe 124 and to the kelly 110, which conveys the drilling fluid 122 downhole through the interior of the drill string 108 and through one or more orifices in the drill bit 114. The drilling fluid 122 is then circulated back to the surface via an annulus 126 defined between the drill string 108 and the walls of the wellbore 116. At the surface, the recirculated or spent drilling fluid 122 exits the annulus 126 and can be conveyed to one or more fluid processing unit(s) 128 via an interconnecting flow line 130. After passing through the fluid processing unit(s) 128, a "cleaned" drilling fluid 122 is deposited into a nearby retention pit 132 (e.g., a mud pit). While the fluid processing unit(s) 128 is illustrated as being arranged at the outlet of the wellbore 116 via the annulus 126, those skilled in the art will readily appreciate that the fluid processing unit(s) 128 can be arranged at any other location in the drilling assembly 100 to facilitate its proper function, without departing from the scope of the disclosure.

The composition including wrinkled capsules can be added to the drilling fluid 122 via a mixing hopper 134 communicably coupled to or otherwise in fluid communication with the retention pit 132. The mixing hopper 134 can include mixers and related mixing equipment known to those skilled in the art. In other embodiments, however, the composition including wrinkled capsules can be added to the drilling fluid 122 at any other location in the drilling assembly 100. In at least one embodiment, for example, there could be more than one retention pit 132, such as multiple retention pits 132 in series. Moreover, the retention pit 132 can be representative of one or more fluid storage facilities and/or units where the composition including wrinkled capsules can be stored, reconditioned, and/or regulated until added to the drilling fluid 122.

As mentioned above, the composition including wrinkled capsules can directly or indirectly affect the components and equipment of the drilling assembly 100. For example, the composition including wrinkled capsules can directly or indirectly affect the fluid processing unit(s) 128, which can include one or more of a shaker (e.g., shale shaker), a centrifuge, a hydrocyclone, a separator (including magnetic and electrical separators), a desilter, a desander, a separator, a filter (e.g., diatomaceous earth filters), a heat exchanger, or any fluid reclamation equipment. The fluid processing unit(s) 128 can further include one or more sensors, gauges, pumps, compressors, and the like used to store, monitor, regulate, and/or recondition the composition including wrinkled capsules.

The composition including wrinkled capsules can directly or indirectly affect the pump 120, which representatively includes any conduits, pipelines, trucks, tubulars, and/or pipes used to fluidically convey the composition including wrinkled capsules to the subterranean formation; any pumps, compressors, or motors (e.g., topside or downhole) used to drive the composition into motion; any valves or related joints used to regulate the pressure or flow rate of the composition; and any sensors (e.g., pressure, temperature, flow rate, and the like), gauges, and/or combinations thereof, and the like. The composition including wrinkled capsules can also directly or indirectly affect the mixing hopper 134 and the retention pit 132 and their assorted variations.

The composition including wrinkled capsules can also directly or indirectly affect the various downhole or subterranean equipment and tools that can come into contact with the composition including wrinkled capsules such as the drill string 108, any floats, drill collars, mud motors, downhole motors, and/or pumps associated with the drill string 108, and any measurement while drilling (MWD)/logging while drilling (LWD) tools and related telemetry equipment, sensors, or distributed sensors associated with the drill string 108. The composition including wrinkled capsules can also directly or indirectly affect any downhole heat exchangers, valves, and corresponding actuation devices, tool seals, packers, and other wellbore isolation devices or components, and the like associated with the wellbore 116. The composition including wrinkled capsules can also directly or indirectly affect the drill bit 114, which can include roller cone bits, polycrystalline diamond compact (PDC) bits, natural diamond bits, hole openers, reamers, coring bits, and the like.

While not specifically illustrated herein, the composition including wrinkled capsules can also directly or indirectly affect any transport or delivery equipment used to convey the composition including wrinkled capsules to the drilling assembly 100 such as, for example, any transport vessels, conduits, pipelines, trucks, tubulars, and/or pipes used to fluidically move the composition including wrinkled capsules from one location to another; any pumps, compressors, or motors used to drive the composition into motion; any valves or related joints used to regulate the pressure or flow rate of the composition; and any sensors (e.g., pressure and temperature), gauges, and/or combinations thereof, and the like.

System or Apparatus.

In various embodiments, the present invention provides a system. The system can be any suitable system that can use or that can be generated by use of an embodiment of the composition described herein in a subterranean formation, or that can perform or be generated by performance of a method for using the composition described herein. The system can include a composition including at least one wrinkled capsule including a hydrophobic core and a wrinkled shell, such as any embodiment of a wrinkled capsule described herein. The system can also include a subterranean formation including the composition therein. In some embodiments, the composition in the system can also include a downhole fluid, or the system can include a mixture of the composition and downhole fluid. In some embodiments, the system can include a tubular, and a pump configured to pump the composition into the subterranean formation through the tubular.

Various embodiments provide systems and apparatus configured for delivering the composition described herein to a subterranean location and for using the composition therein, such as for a drilling operation, or a fracturing operation (e.g., pre-pad, pad, slurry, or finishing stages), spotting, clean-up, completion, remedial treatment, abandonment, treatment with a pill, acidizing, cementing, packing, logging, imaging, or a combination thereof. In various embodiments, the system or apparatus can include a pump fluidly coupled to a tubular (e.g., any suitable type of oilfield pipe, such as pipeline, drill pipe, production tubing, and the like), with the tubular containing a composition including the wrinkled capsules described herein.

In some embodiments, the system can include a drill string disposed in a wellbore, with the drill string including a drill bit at a downhole end of the drill string. The system can also include an annulus between the drill string and the wellbore. The system can also include a pump configured to circulate the composition through the drill string, through the drill bit, and back above-surface through the annulus. In some embodiments, the system can include a fluid processing unit configured to process the composition exiting the annulus to generate a cleaned drilling fluid for recirculation through the wellbore.

The pump can be a high pressure pump in some embodiments. As used herein, the term "high pressure pump" will refer to a pump that is capable of delivering a fluid to a subterranean formation (e.g., downhole) at a pressure of about 1000 psi or greater. A high pressure pump can be used when it is desired to introduce the composition to a subterranean formation at or above a fracture gradient of the subterranean formation, but it can also be used in cases where fracturing is not desired. In some embodiments, the high pressure pump can be capable of fluidly conveying particulate matter, such as proppant particulates, into the subterranean formation. Suitable high pressure pumps will be known to one having ordinary skill in the art and can include floating piston pumps and positive displacement pumps.

In other embodiments, the pump can be a low pressure pump. As used herein, the term "low pressure pump" will refer to a pump that operates at a pressure of about 1000 psi or less. In some embodiments, a low pressure pump can be fluidly coupled to a high pressure pump that is fluidly coupled to the tubular. That is, in such embodiments, the low pressure pump can be configured to convey the composition to the high pressure pump. In such embodiments, the low pressure pump can "step up" the pressure of the composition before it reaches the high pressure pump.

In some embodiments, the systems or apparatuses described herein can further include a mixing tank that is upstream of the pump and in which the composition is formulated. In various embodiments, the pump (e.g., a low pressure pump, a high pressure pump, or a combination thereof) can convey the composition from the mixing tank or other source of the composition to the tubular. In other embodiments, however, the composition can be formulated offsite and transported to a worksite, in which case the composition can be introduced to the tubular via the pump directly from its shipping container (e.g., a truck, a railcar, a barge, or the like) or from a transport pipeline. In either case, the composition can be drawn into the pump, elevated to an appropriate pressure, and then introduced into the tubular for delivery to the subterranean formation.

Figure 3:
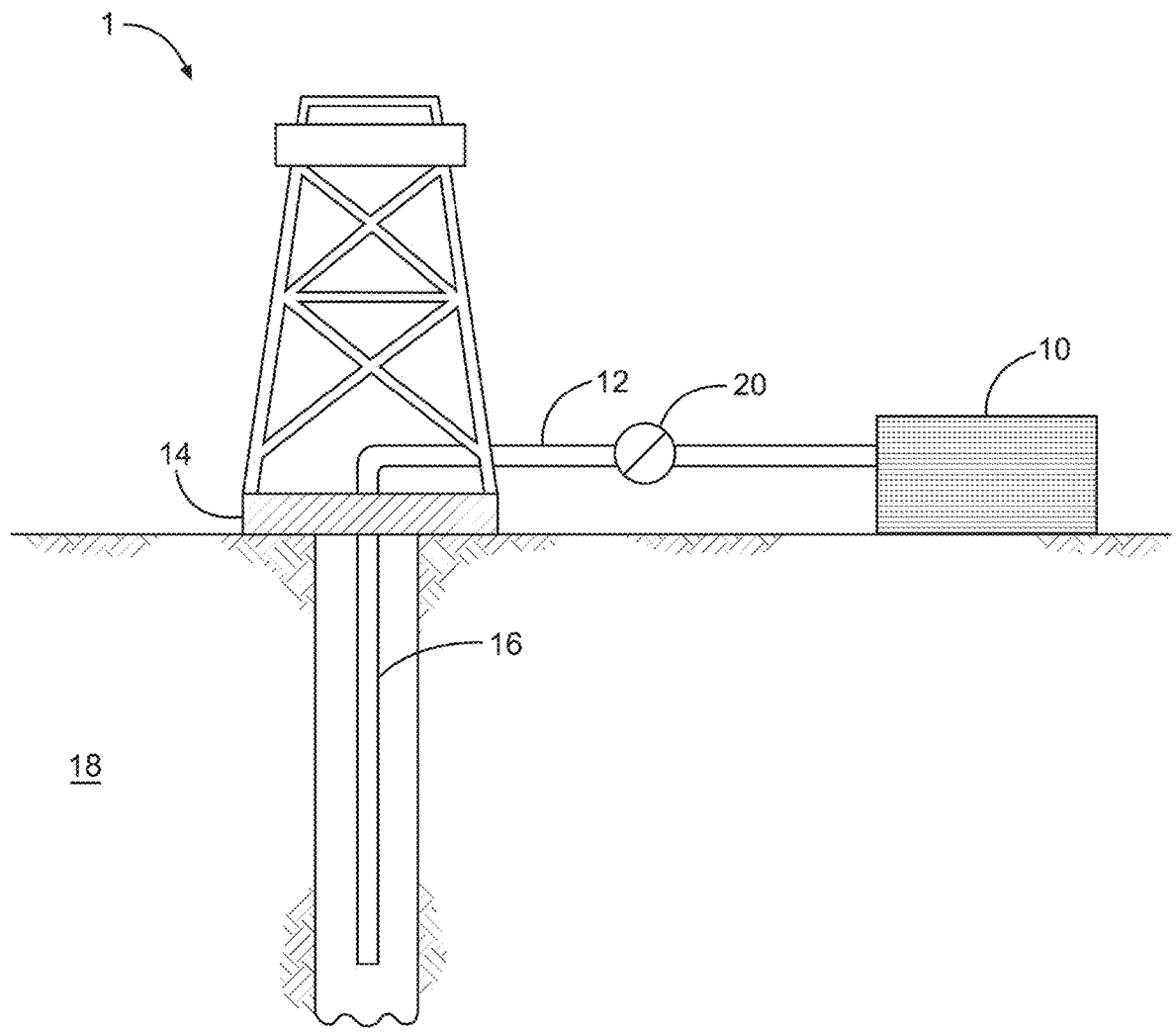
FIG. 3 illustrates a system or apparatus for delivering a composition to a subterranean formation, in accordance with various embodiments.

FIG. 3 shows an illustrative schematic of systems and apparatuses that can deliver embodiments of the compositions of the present invention to a subterranean location, according to one or more embodiments. It should be noted that while FIG. 3 generally depicts a land-based system or apparatus, it is to be recognized that like systems and apparatuses can be operated in subsea locations as well. Embodiments of the present invention can have a different scale than that depicted in FIG. 3. As depicted in FIG. 3, system or apparatus 1 can include mixing tank 10, in which an embodiment of the composition can be formulated. The composition can be conveyed via line 12 to wellhead 14, where the composition enters tubular 16, with tubular 16 extending from wellhead 14 into subterranean formation 18. Upon being ejected from tubular 16, the composition can subsequently penetrate into subterranean formation 18. Pump 20 can be configured to raise the pressure of the composition to a desired degree before its introduction into tubular 16. It is to be recognized that system or apparatus 1 is merely exemplary in nature and various additional components can be present that have not necessarily been depicted in FIG. 3 in the interest of clarity. In some examples, additional components that can be present include supply hoppers, valves, condensers, adapters, joints, gauges, sensors, compressors, pressure controllers, pressure sensors, flow rate controllers, flow rate sensors, temperature sensors, and the like.

Although not depicted in FIG. 3, at least part of the composition can, in some embodiments, flow back to wellhead 14 and exit subterranean formation 18. The composition that flows back can be substantially diminished in the concentration of wrinkled capsules therein. In some embodiments, the composition that has flowed back to wellhead 14 can subsequently be recovered, and in some examples reformulated, and recirculated to subterranean formation 18.

It is also to be recognized that the disclosed composition can also directly or indirectly affect the various downhole or subterranean equipment and tools that can come into contact with the composition during operation. Such equipment and tools can include wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, and the like), logging tools and related telemetry equipment, actuators (e.g., electromechanical devices, hydromechanical devices, and the like), sliding sleeves, production sleeves, plugs, screens, filters, flow control devices (e.g., inflow control devices, autonomous inflow control devices, outflow control devices, and the like), couplings (e.g., electro-hydraulic wet connect, dry connect, inductive coupler, and the like), control lines (e.g., electrical, fiber optic, hydraulic, and the like), surveillance lines, drill bits and reamers, sensors or distributed sensors, downhole heat exchangers, valves and corresponding actuation devices, tool seals, packers, cement plugs, bridge plugs, and other wellbore isolation devices or components, and the like. Any of these components can be included in the systems and apparatuses generally described above and depicted in FIG. 3.

Wrinkled Capsule for Treatment of a Subterranean Formation.

Various embodiments provide a wrinkled capsule for treatment of a subterranean formation. The wrinkled capsule can be any embodiment of a wrinkled capsule described herein. The wrinkled capsule can include a hydrophobic core and a wrinkled shell.

Various embodiments provide a composition for treatment of a subterranean formation. The composition can be any suitable composition that includes at least one of the wrinkled capsules. In some embodiments, the composition further includes a downhole fluid, or is a downhole fluid. The downhole fluid can be any suitable downhole fluid. In some embodiments, the downhole fluid drilling fluid, stimulation fluid, fracturing fluid, spotting fluid, clean-up fluid, completion fluid, remedial treatment fluid, abandonment fluid, pill, acidizing fluid, cementing fluid, packer fluid, logging fluid, imaging fluid, or a combination thereof.

In some embodiments, the wrinkled capsule can have a particle size of about 0.1 microns to about 500 microns. The wrinkled capsule can include a hydrophobic core that is about 0.001 vol % to about 99.999 vol % of the wrinkled capsule. The hydrophobic core can include a hydrophobic medium including an oil, an organic solvent, or a combination thereof. The wrinkled capsule can also include a wrinkled shell that is about 1 nm to about 10 microns thick and that is about 0.001 vol % to about 99.999 vol % of the wrinkled capsule, the wrinkled shell including one or more polymers each independently including one or more repeating units formed by polymerization of a substituted or unsubstituted ($C_3$-$C_{50}$)alkenoic acid or a salt or substituted or unsubstituted ($C_1$-$C_{50}$)hydrocarbyl ester thereof, a substituted or unsubstituted ($C_2$-$C_{50}$)alkenylnitrile, a substituted or unsubstituted ($C_2$-$C_{50}$)alkenyl($C_6$-$C_{50}$)aryl, a halide-substituted ($C_2$-$C_{50}$)alkene wherein the ($C_2$-$C_{50}$)alkene is further substituted or unsubstituted, or a combination thereof. In various embodiments, the core can further include a cargo. The cargo can be a blowing agent, a lubricant, a tracer, a dye, a contrast enhancer, an acid, an acid-forming reagent, a base, a base-forming reagent, an amine, a catalyst, a breaker, an inorganic particle, a proppant, a liquid, a gas, a dispersed solid, a multi-phase substance, or a combination thereof.

Method for Preparing a Wrinkled Capsule or Compositions Including the Same for Treatment of a Subterranean Formation.

In various embodiments, the present invention provides a method for preparing a wrinkled capsule for treatment of a subterranean formation. The method can include forming any wrinkled capsule described herein. In various embodiments, the present invention provides a method for preparing a composition for treatment of a subterranean formation.

The method can be any suitable method that produces a composition described herein. For example, the method can include forming a composition including at least one wrinkled capsule that includes a hydrophobic core and a wrinkled shell. The wrinkled capsule can be any embodiment of a wrinkled capsule described herein.

The method can include forming droplets of a hydrophobic medium in water, wherein the droplets include shell monomers. The forming can be an emulsification. The formed droplets can include an polymeric initiator, a crosslinker (e.g., a polyvinyl crosslinker), or a combination thereof. The method can include polymerizing the monomers, to form a shell around each droplet, to form the wrinkled capsule.

In some embodiments, after the forming of the droplets and before the polymerizing, the method can include expanding the droplets, such as by subjecting the droplets to elevated temperature or decreased pressure to cause one or more components of the droplet to expand (e.g., to change from liquid to gas). In some embodiments, after the polymerizing, the method can include contracting the droplets, such as by subjecting the droplets to decreased temperature or increased pressure to cause one or more components of the droplet to contract (e.g., to condense from gas into liquid), to form the wrinkled capsule.

EXAMPLES

Various embodiments of the present invention can be better understood by reference to the following Examples which are offered by way of illustration. The present invention is not limited to the Examples given herein.

Example 1. Synthesis of Particles

In a typical experiment, a polymerization reaction vial was charged with an organic phase including 70 vol % monomers (e.g., acrylonitrile (AN), vinylidene dichloride (VDC)), trimethylolpropane triacrylate (TMPTA) as a cross-linking agent (0-2 wt %, given as wt % of monomers used to form the shell throughout the Examples), about 30 vol % core materials (n-decane with, e.g., PFH, oil red O), and azobisisobutyronitrile (AIBN) (1 wt % of monomers) initiator. An aqueous phase was separately prepared by mixing sodium hydroxide (0.263 g NaOH) with magnesium chloride (0.915 g $MgCl_2.6H_2O$) in 15 mL of deionized water to make 0.3 M magnesium hydroxide dispersion, followed by vigorous stirring for 30 min with degassing by nitrogen. This dispersion, together with 0.05 g of sodium 2-ethylhexyl sulfate (1 wt % aq), was added to the reaction vial to obtain the ratio of organic phase to aqueous phase of 1:2 (by weight). The mixture was emulsified using a Vialmix® high-shear shaker and polymerization was performed at 63° C. for 16 h. After cooling to ambient temperature, the products were washed by acetic acid (10 wt % aq), filtered, and subsequently dried at room temperature. The obtained capsules had diameters of approximately 5-15 μm. For the case that water-soluble monomer (acrylic acid (AA)) was used as shell monomer, colloidal silica particles were used as a stabilizer together with PVP and $K_2Cr_2O_7$ (inhibits polymerization in the water phase) in the following manner: a typical organic phase included AIBN (0.006 g), AN (0.442 g), 1 wt % TMPTA in AN solution (0.01 g), AA (0.162 g) and 0.3 mL of core liquid components (certain ratio of PFH/n-decane) was mixed with a water phase included LUDOX HS-30 (0.03 g), 30 wt % PVP aqueous solution (0.02 g), 25 wt % $K_2Cr_2O_7$ aqueous solution (0.016 g) and deionized water (2 g). The pH of water phase was adjusted to 4 by hydrochloric acid. The mixture was sealed and shaken in the same way as described above in this paragraph. Polymerization was processed at 63° C. for 16 hours.

Example 2. Variation of Monomers, with Cores Including Blowing Agent

Figure 4A:
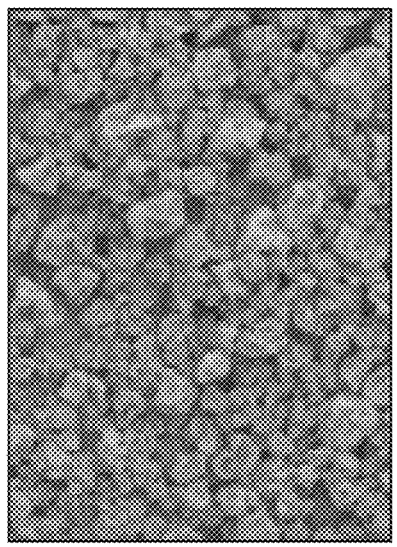
FIGS. 4A-C illustrate scanning electron microscope (SEM)-images of various wrinkled capsules formed from cores including perfluorohexane (PFH) blowing agent, in accordance with various embodiments.
Figure 4B:
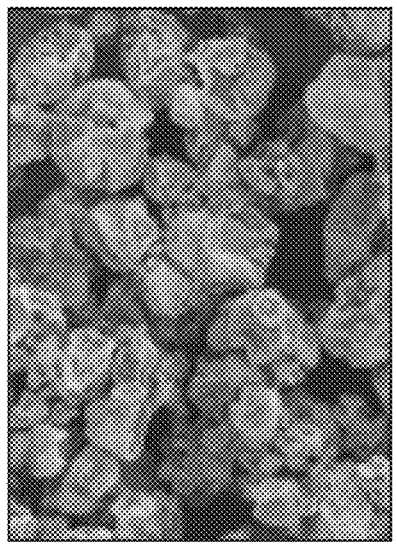
Figure 4C:
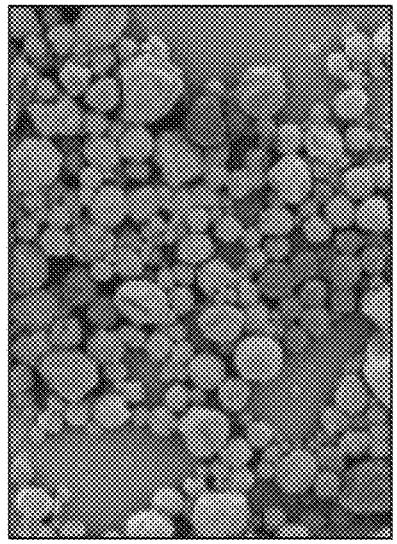
Figure 5C:
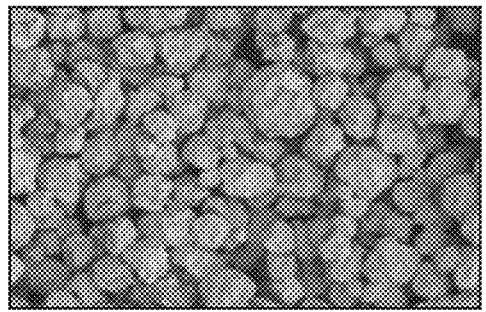
FIGS. 5A-E illustrate SEM-images of wrinkled capsules formed from cores including various blowing agents, and 5F-I showing SEM-images of the interior of the capsules, in accordance with various embodiments.
Figure 5B:
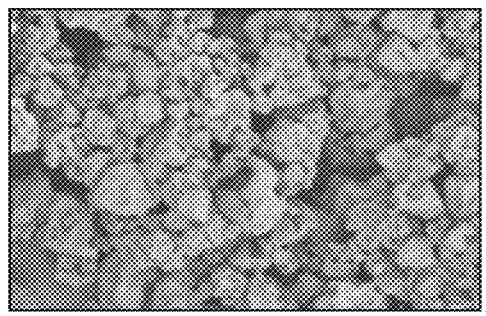
Figure 5A:
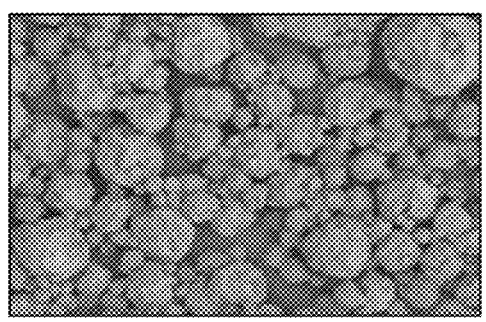
Figure 5E:
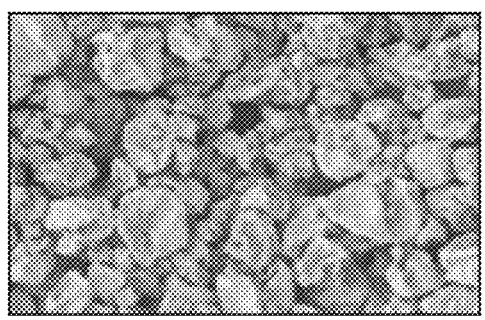
Figure 5D:
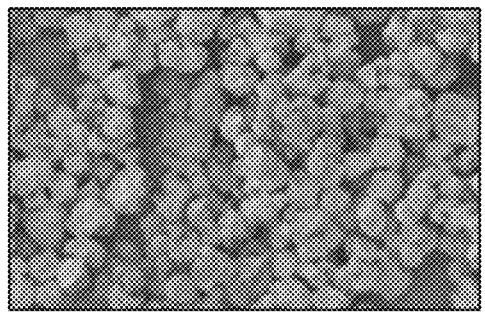
Figure 5G:
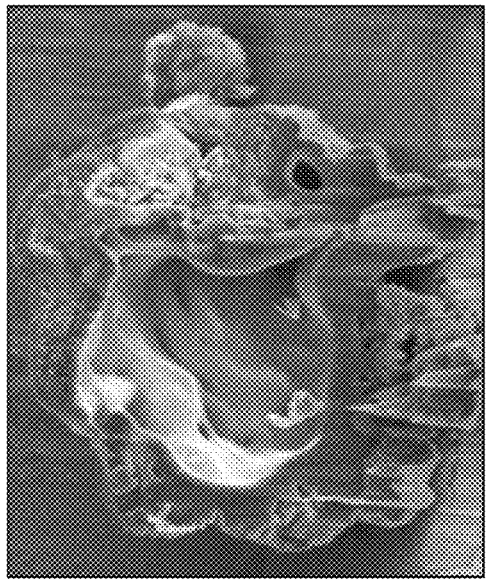
Figure 5I:
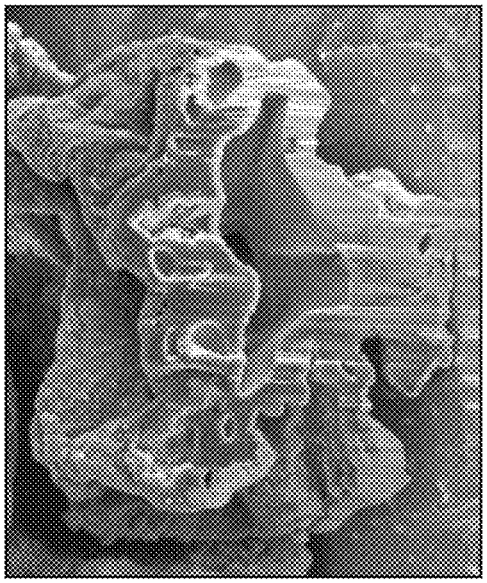
Figure 5F:
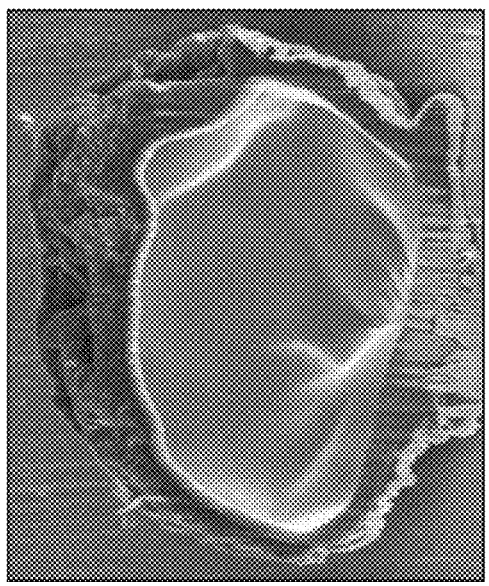
Figure 5H:
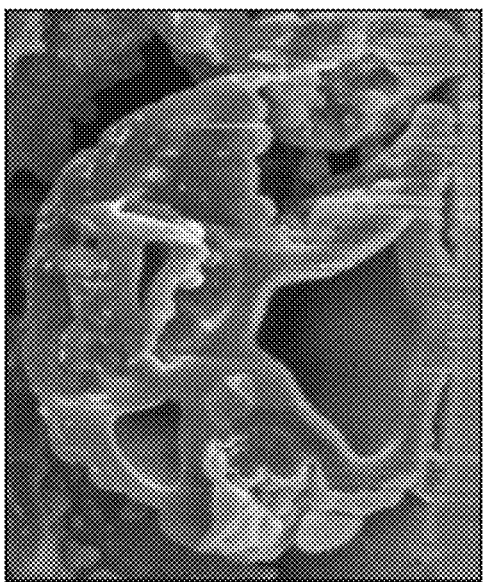

Following the procedure of Example 1, a variety of monomers (hydroxyethyl methacrylate (HEMA), acrylic acid (AA), 1,1-dichloroethene (VDC), and tert-butyl acrylate (tBA)) were used with PFH blowing agent, as shown in Table 1. The different shell compositions formed wrinkled capsules, indicating that the presence of a volatile blowing agent in the core can cause the wrinkled effect even without volatile monomers being present. SEM-images of wrinkled capsules are shown in FIGS. 4A (AN/VDC), 4B (HEMA) and 4C (AA/tBA).

tane (IP), tetramethyl silane (TMS)) but also non-volatile cargo components (perfluoropentane (PFP) and perfluorooctane (PFO)) caused the wrinkled structure for AN/VDC shell capsules, suggesting the volatile monomer VDC can cause the wrinkling. There were no significant correlations between wrinkle and the chemical structure/properties of the core components. SEM-images of the wrinkled capsules are shown in FIG. 5A (IP), FIG. 5B (PFP), FIG. 5C (TMS), FIG. 5D (PFH), and FIG. 5E (PFO). SEM-images of FIB-milled wrinkled capsules are shown in FIGS. 5F (IP), 5G (PFP), 5H (PFH), and 5I (PFO).

TABLE 1

Conditions for Example 2.
The designation "NA" indicates not available.

| Monomer, (vol/vol) | Initiator, conc. (wt %) | Crosslinker, conc. (wt %) | Cargo, conc. (vol %) | Shell:core volume ratio (vol/vol) | Particle size (µm) | Shell thickness (µm) | W |
|---|---|---|---|---|---|---|---|
| AN/VDC 30/70 | AIBN, 1 wt % to monomers | TMPTA, 0.28 wt % to monomers | PFH, 100% | 70:30 | 6.6 | 0.52 | 4.4 |
| HEMA 100 | AIBN, 1 wt % to monomers | TMPTA, 0.28 wt % to monomer | PFH, 100% | 70:30 | NA | NA | NA |
| AA/tBa 20/80 | AIBN, 1 wt % to monomers | TMPTA, 0.28 wt % to monomers | PFH, 100% | 70:30 | NA | NA | NA |

Example 3. Variation of Cargo with Consistent Monomers

The procedure of Example 1 was following using the conditions shown in Table 2. Cores containing not only volatile cargo components (perfluorohexane (PFH), isopen-

TABLE 2

Conditions for Example 3.
The designation "NA" indicates not available.

| Monomer, conc. (vol/vol) | Initiator, conc. (wt %) | Crosslinker, conc. (wt %) | Cargo, conc. (vol %) | Shell:core volume ratio (vol:vol) | Particle size (µm) | Shell thickness (µm) | W |
|---|---|---|---|---|---|---|---|
| AN/VDC 30/70 | AIBN, 1 wt % to monomers | TMPTA, 0.28 wt % to monomers | IP ($T_{bp}$ = 28° C.), 100% | 70:30 | 9.2 | 1.3 | 3.6 |
| AN/VDC 30/70 | AIBN, 1 wt % to monomers | TMPTA, 0.28 wt % to monomers | PFP ($T_{bp}$ = 28° C.), 100% | 70:30 | 11.1 | 1.3 | 3.8 |
| AN/VDC 30/70 | AIBN, 1 wt % to monomers | TMPTA, 0.28 wt % to monomers | TMS ($T_{bp}$ = 26-28° C.), 100% | 70:30 | NA | NA | NA |
| AN/VDC 30/70 | AIBN, 1 wt % to monomers | TMPTA, 0.28 wt % to monomers | PFH ($T_{bp}$ = 56° C.), 100% | 70:30 | 6.6 | 0.52 | 4.4 |
| AN/VDC 30/70 | AIBN, 1 wt % to monomers | TMPTA, 0.28 wt % to monomers | PFO ($T_{bp}$ = 104° C.), 100% | 70:30 | 17.8 | 1.9 | 4.5 |

Example 4. Quantification of Degree of Wrinkling

Figure 6B:
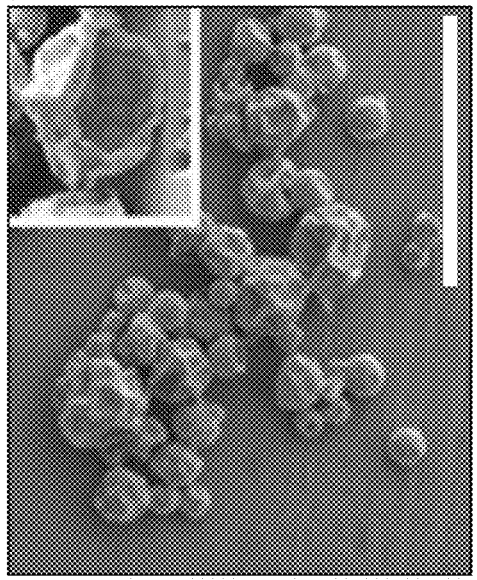
FIGS. 6A-C illustrate SEM-images of wrinkled capsules having various volume ratios of shell to core, with insets showing the interior of the capsules, in accordance with various embodiments.
Figure 6A:
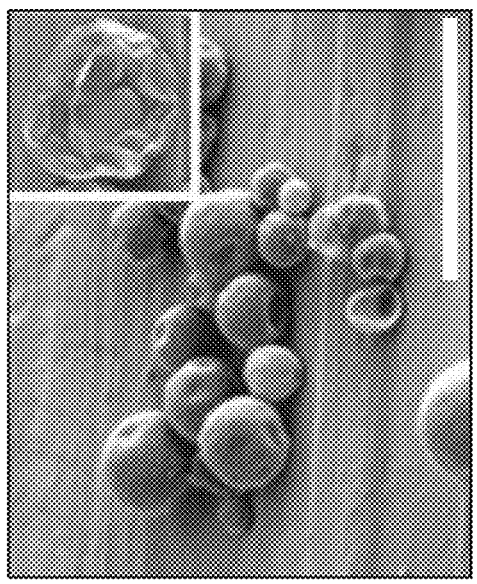
Figure 6C:
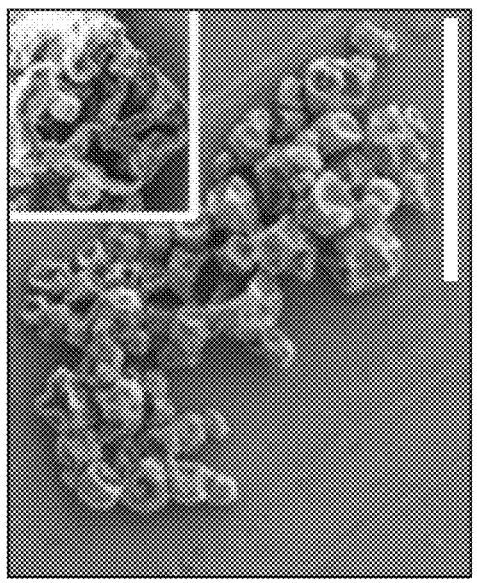

To analyze and understand the nature of shell wrinkling observed for poly(AN-co-VDC) microcapsules, the procedure of Example 1 was carried out using the conditions shown in Table 3, forming wrinkled capsules having different shell:core ratios: 70:30, 50:50, and 30:70 by volume. The cores included 5 mM oil red O (ORO) dissolved in n-decane. Note that the shell thickness did not significantly change for all three capsules. Both overall and interior morphology were characterized by scanning electron microscopy (SEM) and focused ion beam (FIB). SEM-images of the wrinkled capsules are shown in FIG. 6A (70:30), FIG. 6B (50:50), and FIG. 6C (30:70), with the insets showing SEM-images of FIB-milled wrinkled capsules. The scale bar is 40 microns.

TABLE 3

Conditions for Example 4.

| Monomer, conc. | Initiator, conc. | Crosslinker, conc. | Cargo, conc. | Shell:core volume ratio | Particle size ($\mu$m) | Shell thickness ($\mu$m) | W |
|---|---|---|---|---|---|---|---|
| AN/VDC 30/70 | AIBN, 1 wt % | TMPTA, 0.28 wt % | 5 mM ORO/n-decane | 70:30 | 3.7 | 0.54 | 5.3 |
| AN/VDC 30/70 | AIBN, 1 wt % | TMPTA, 0.28 wt % | 5 mM ORO/n-decane | 50:50 | 4.2 | 0.40 | 3.5 |
| AN/VDC 30/70 | AIBN, 1 wt % | TMPTA, 0.28 wt % | 5 mM ORO/n-decane | 30:70 | 3.1 | 0.41 | 1.1 |

To quantify the wrinkled morphology, the wrinkledness parameter (W) was introduced as the ratio of shell perimeter and circumference (P/C). FIG. 7A illustrates a SEM-image of the wrinkled capsule having a shell:core volume ratio of 70:30, FIG. 7B illustrates an FIB image showing the interior of the capsule, FIG. 7C illustrates the perimeter of the shell, and FIG. 7D illustrates the circumference of a circle that fits closely around the shell.

Example 5. Variation of Amount of Blowing Agent Included in Core

Figure 8C:
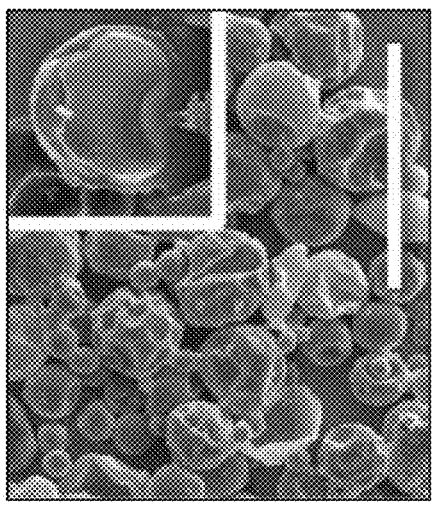
FIGS. 8A-D illustrate wrinkled capsules including various amounts of PFH therein, in accordance with various embodiments.
Figure 8B:
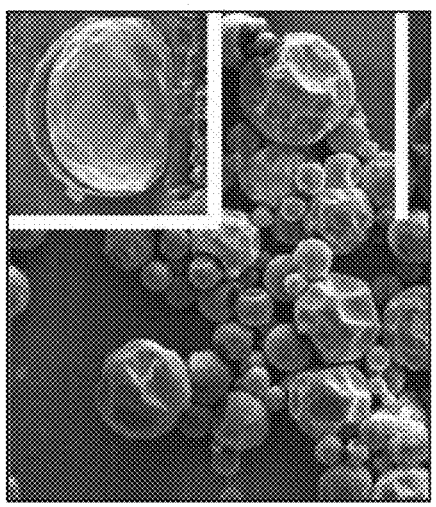
Figure 8D:
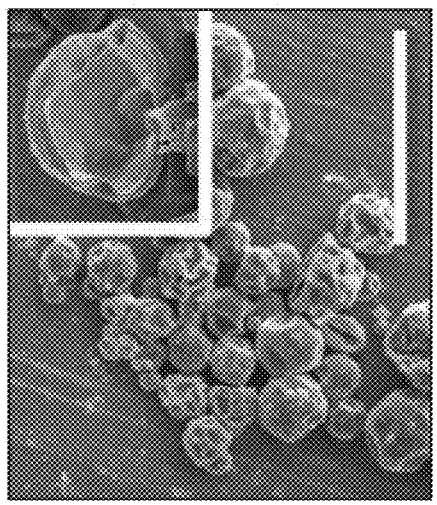
Figure 8A:
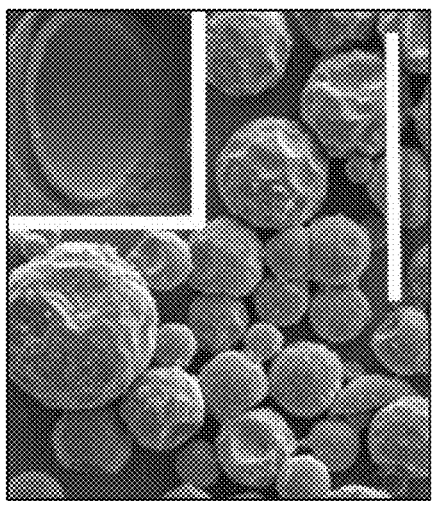
Figure 9A:
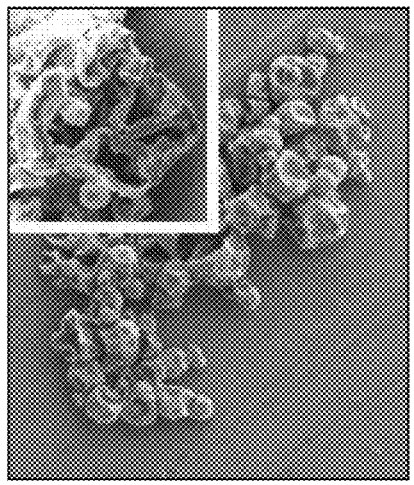
FIGS. 9A-F illustrate SEM-images of wrinkled capsules having various shell compositions and various shell:core volume ratios, with insets showing SEM-images of the interior of the capsules, in accordance with various embodiments.
Figure 9B:
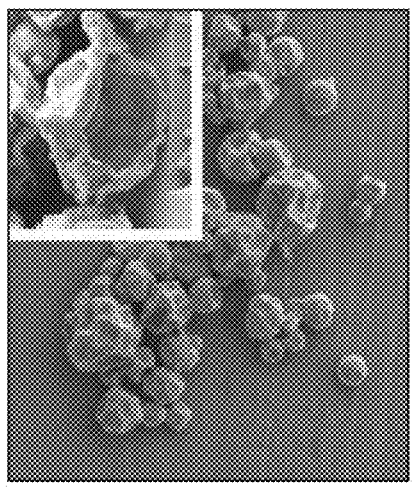
Figure 9C:
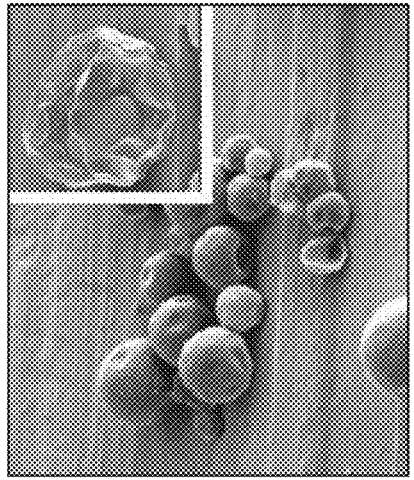
Figure 9D:
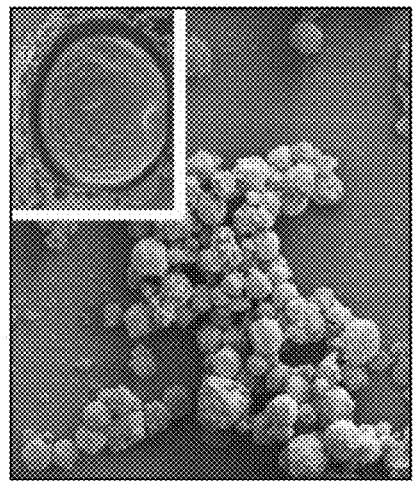
Figure 9E:
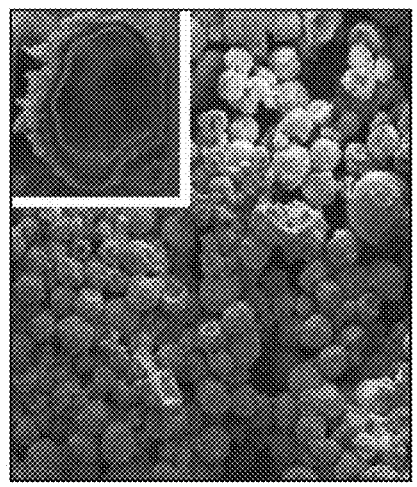
Figure 9F:
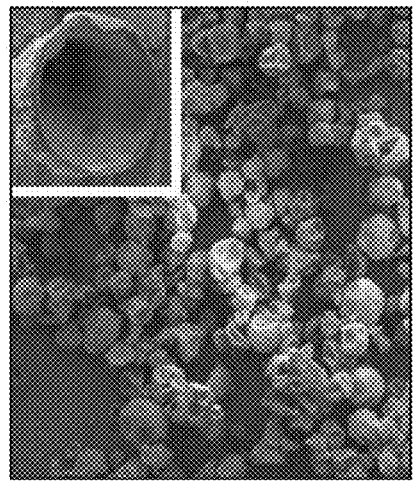

The procedure of Example 1 was followed, using the conditions shown in Table 4. It is notable that the degree of wrinkling (volume-to-surface area) apparently depends on the amounts of blowing agent added in the core. Increasing volume fraction of the blowing agent (PFH) caused a more wrinkled structure, confirming the volatile blowing agents somewhat contribute to the wrinkle formation. SEM-images of the wrinkled capsules are shown in FIG. 8A (0 vol % PFH encapsulated), FIG. 8B (10 vol % PFH encapsulated), FIG. 8C (30 vol % PFH encapsulated), and FIG. 8D (70 vol % PFH encapsulated), with scale bars of 50 microns.

Example 6. Non-Volatile Monomers and Non-Volatile Cargo

The procedure of Example 1 was repeated using the conditions shown in Table 5. The density raise during polymerization is another cause of the wrinkling. Comparing two different microcapsules of poly(AN-co-VDC) and poly(AN-co-AA) that encapsulated non-volatile n-decane as a cargo, since both acrylonitrile and acrylic acid are not volatile, any possible wrinkling appearing on poly(AN-co-AA) would result from causes other than volatility of ingredients. In FIGS. 9A-F, the capsule morphologies of both shells with different shell:core ratios are compared. Unlike the VDC-containing shells, the increase of shell fraction in poly(AN-co-AA) capsules resulted in a less wrinkled structure with a thicker shell. To verify this difference of morphology between AN/VDC and AN/AA shells from the aspect of the shell volume reduction, the density change in the shell was focused. Radical polymerization grows a rigid crosslinked shell around the emulsion droplets as the droplets are consumed by the polymerization, which drives the contraction of the shells to deform via a buckling stability. After polymerization, the density of AN/VDC capsules increased from 1.09 g/cm$^3$ (density of the monomer) to 1.48-1.6 g/cm$^3$ (density of the fully polymerized capsules). This change in the droplet volume, associated with the conversion of monomers into the low molecular weight oligomers that constitute the polymeric shell, more or less drives the shell contraction during polymerization. SEM-images of the wrinkled capsules are shown for AN/VDC in FIG. 9A (shell:core volume=70:30), FIG. 9B (50:50), FIG. 9C (30:70), and for AA/VDC in FIG. 9D (70:30), FIG. 9E (50:50), and FIG. 9F (30:70), with all scale bars representing 50 $\mu$m.

TABLE 4

Conditions for Example 5.

| Monomer, conc. | Initiator, conc. | Crosslinker, conc. | Cargo, conc. (vol/vol) | Shell:core volume ratio | Particle size ($\mu$m) | Shell thickness ($\mu$m) | W |
|---|---|---|---|---|---|---|---|
| AN/VDC 30/70 | AIBN, 1 wt % | TMPTA, 0.28 wt % | PFH/n-decane, 10/90 | 30:70 | 7.0 | 0.85 | 1.3 |
| AN/VDC 30/70 | AIBN, 1 wt % | TMPTA, 0.28 wt % | PFH/n-decane, 30/70 | 30:70 | 6.9 | 0.81 | 1.3 |
| AN/VDC 30/70 | AIBN, 1 wt % | TMPTA, 0.28 wt % | PFH/n-decane, 0/100 | 30:70 | 7.4 | 0.80 | 1.4 |
| AN/VDC 30/70 wt | AIBN, 1 wt % | TMPTA, 0.28 wt % | PFH/n-decane, 70/30 | 30:70 | 7.7 | 0.74 | 1.5 |

TABLE 5

Conditions for Example 6. The decane was n-decane.

| Monomer, conc. | Initiator, conc. | Crosslinker, conc. | Cargo, conc. | Shell:core volume ratio | Particle size | Shell thickness | W |
|---|---|---|---|---|---|---|---|
| AN/VDC 30/70 | AIBN, 1 wt % | TMPTA, 0.28 wt % | 5 mM ORO/decane | 70:30 | 3.7 | 0.54 | 5.3 |
| AN/VDC 30/70 | AIBN, 1 wt % | TMPTA, 0.28 wt % | 5 mM ORO/decane | 50:50 | 4.2 | 0.40 | 3.5 |
| AN/VDC 30/70 | AIBN, 1 wt % | TMPTA, 0.28 wt % | 5 mM ORO/decane | 30:70 | 3.1 | 0.41 | 1.1 |
| AN/AA 78/22 | AIBN, 1 wt % | TMPTA, 0.28 wt % | 5 mM ORO/decane | 70:30 | 4.3 | 0.39 | 1.3 |
| AN/AA 78/22 | AIBN, 1 wt % | TMPTA, 0.28 wt % | 5 mM ORO/decane | 50:50 | 4.0 | 0.63 | 1.2 |
| AN/AA 78/22 | AIBN, 1 wt % | TMPTA, 0.28 wt % | 5 mM ORO/decane | 30:70 | 4.2 | 0.94 | 1.1 |

Example 7. Variation of Stiffness of Shell

Figure 10A:
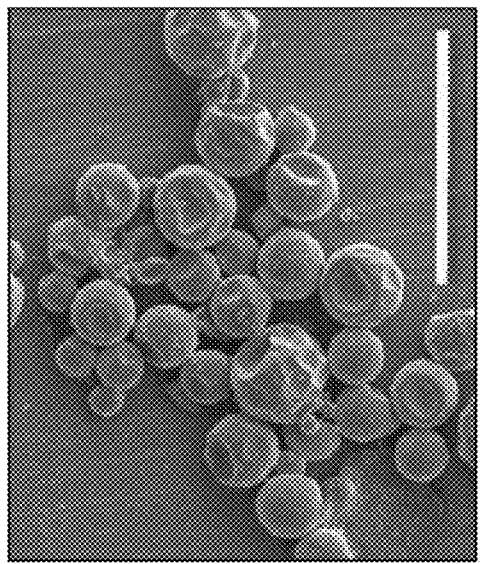
FIGS. 10A-C illustrate wrinkled capsules formed using various amounts of crosslinker, in accordance with various embodiments.
Figure 10B:
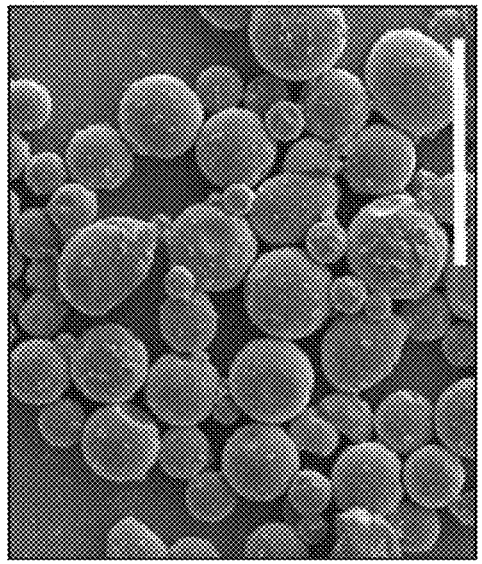
Figure 10C:
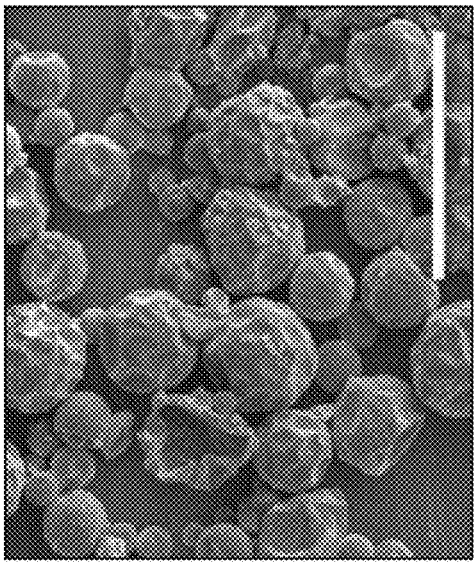

The procedure of Example 1 was carried out while varying the crosslinker concentration as shown in Table 6. The stiffness of the shell plays another role on the morphology of the final capsules and depends on the amount of self-crosslinking of the constituent polymer network. If no or weak crosslink networks are incorporated, the droplets expand and shrink almost freely during polymerization, yielding spherical capsules with a slightly corrugated surface. For higher crosslinking densities, the shells resist the droplets shrinkage and respond with a deformation. Droplets with a crosslinker concentration greater than 0.28 wt % of the monomers crumpled and buckled randomly, while droplets with no crosslinker underwent a single buckling, giving the spherical dimple-like deformation on the surface. The stiffness of shells also affected the thermal properties. The capsules with 0 wt % crosslinker still could expand; however, they tended to shrink immediately after the expansion by a rupture of the polymeric shell. A higher strength of the polymer shell being crosslinked is suitable for good expansion with the resistance toward shrinkage. SEM-images of the wrinkled capsules are shown in FIG. 10A (0 wt % crosslinker), FIG. 10B (0.28 wt % crosslinker), and FIG. 10C (0.56 wt % crosslinker), with a scale bar of 50 microns.

Figure 11A:
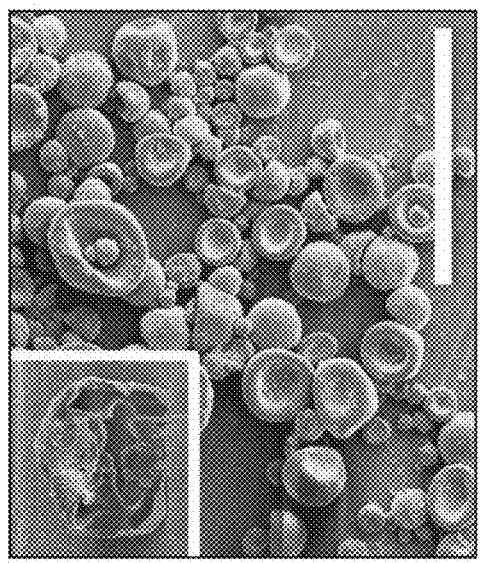
FIGS. 11A-C illustrate wrinkled capsules having various shell compositions, in accordance with various embodiments.
Figure 11B:
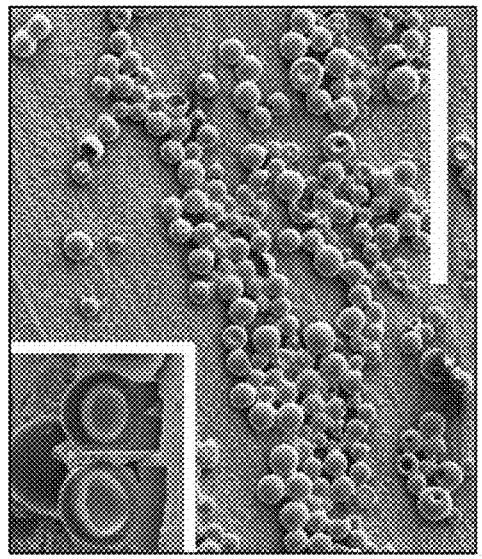
Figure 11C:
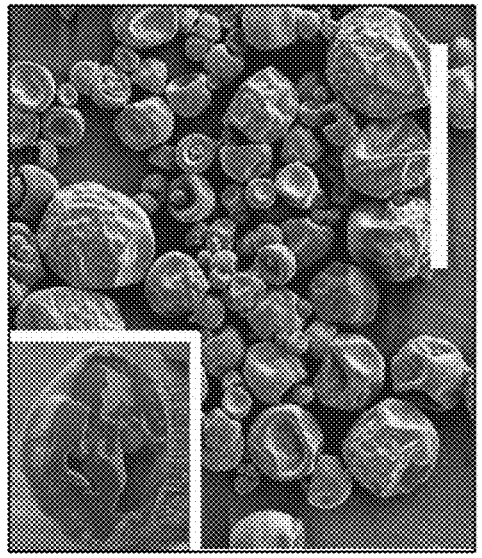

Example 8. Methyl methacrylate/acrylonitrile/vinylidene Chloride Copolymer Shell The procedure of Example 1 was followed, using the conditions given in Table 7. By adjusting our existing synthetic procedure, expandable capsules composed of poly (MMA-c-St) were prepared yielding much smaller-sized spherical capsules with smooth surface morphology (FIG. 11A). The spherical (e.g., non-wrinkled) characteristics contribute to a symmetrical (uniform) expansion resulting in a uniform decrease in the thickness of the shell after expansion. To investigate the effect of methyl methacrylate content on the wrinkled AN/VDC shell, AN was replaced with MMA in the range of 0-100 vol %. MMA/AN/VDC shell with 30 mol % acrylate had a single dimple whereas MMA/AN/VDC shell with 8 mol % acrylate had a rough corrugated surface (FIGS. 11B-C). SEM-images of the wrinkled capsules are shown in FIG. 11A (MMA/St), FIG. 11B (30 mol % AN), and FIG. 11C (8 mol % AN), with insets showing SEM-images of an FIB-milled wrinkled capsule, with scale bars of 100 microns.

TABLE 6

Conditions for Example 7.

| Monomer, conc. | Initiator, conc. | Crosslinker, conc. | Cargo, conc. | Shell:core volume ratio | Particle size ($\mu$m) | Shell thickness ($\mu$m) | W |
|---|---|---|---|---|---|---|---|
| AN/VDC 30/70 | AIBN, 1 wt % | TMPTA, 0 wt % | n-decane, 100% | 70:30 | 6.9 | 0.89 | 1.1 |
| AN/VDC 30/70 | AIBN, 1 wt % | TMPTA, 0.28 wt % | n-decane, 100% | 70:30 | 6.8 | 0.85 | 1.3 |
| AN/VDC 30/70 | AIBN, 1 wt % | TMPTA, 0.56 wt % | n-decane, 100% | 70:30 | 6.6 | 0.76 | 1.6 |

TABLE 7

Conditions for Example 8. The decane was n-decane.

| Monomer, conc. | Initiator, conc. | Crosslinker, conc. | Cargo, conc. | Shell:core volume ratio | Particle size (μm) | Shell thickness | W |
|---|---|---|---|---|---|---|---|
| MMA/St 80/20 | AIBN, 1 wt % | TMPTA, 0.28 wt % | PFH, 30 vol % decane, 70 vol % | 70:30 | 4.5 | 1.0 | 1.0 |
| MMA/AN/VDC 30/0/70 | AIBN, 1 wt % | TMPTA, 0.28 wt % | PFH, 30 vol % decane, 70 vol % | 70:30 | 8.7 | 1.2 | 1.5 |
| MMA/AN/VDC 10/20/70 | AIBN, 1 wt % | TMPTA, 0.28 wt % | PFH, 30 vol % decane, 70 vol % | 70:30 | 9.0 | 1.5 | 1.7 |

Example 9. Relationship Between Degree of Wrinkling, Shell Thickness, and Release Behavior Formulations with a larger shell:core ratio were expected to yield capsules with a thicker shell; nevertheless, the variation of shell formulation resulted in a wrinkled capsule structure. Controlling the shell wrinkling and, hence, the surface area provides an additional parameter for regulating the release rate.

Wrinkledness Parameter:

$$W = \frac{S}{S_0} \cong \frac{\frac{V_s}{h}}{4\pi R^2} \cong \frac{\frac{V_s}{h}}{\frac{3V_c}{R}} = \frac{\alpha R}{3h} \quad (eq. 1)$$

Effective Diffusion Coefficient:

$$D_{\text{eff}} \cong \frac{nSD}{h} = \frac{V}{V_c} \frac{SD}{h} \cong \frac{SD}{V_c h} \cong \frac{\alpha D}{h^2} \quad (eq. 2)$$

For a spherical capsule:

$$\alpha \cong \frac{Sh}{V_c} \cong \frac{4\pi R^2 h}{\frac{4\pi}{3}R^3} = \frac{3h}{R} \quad (eq. 3)$$

$$\text{Then, } D_{\text{eff}} = \frac{3D}{Rh} = \frac{\alpha D}{h^2} = \frac{D}{\alpha R^2} \quad (eq. 4)$$

where R: radius of the capsule, h: thickness of the shell, $V_s$: volume fraction of the shell, $V_c$: volume fraction of the core, D: diffusion coefficient of shell material, n: number of capsules, S: a surface area of the shell, $S_0$: a surface area of the corresponding spherical shell, V: volume of dispersed material ($V=V_s+V_c$), $\alpha=V_s/V_c\approx h/V_c$.

Figure 12A:
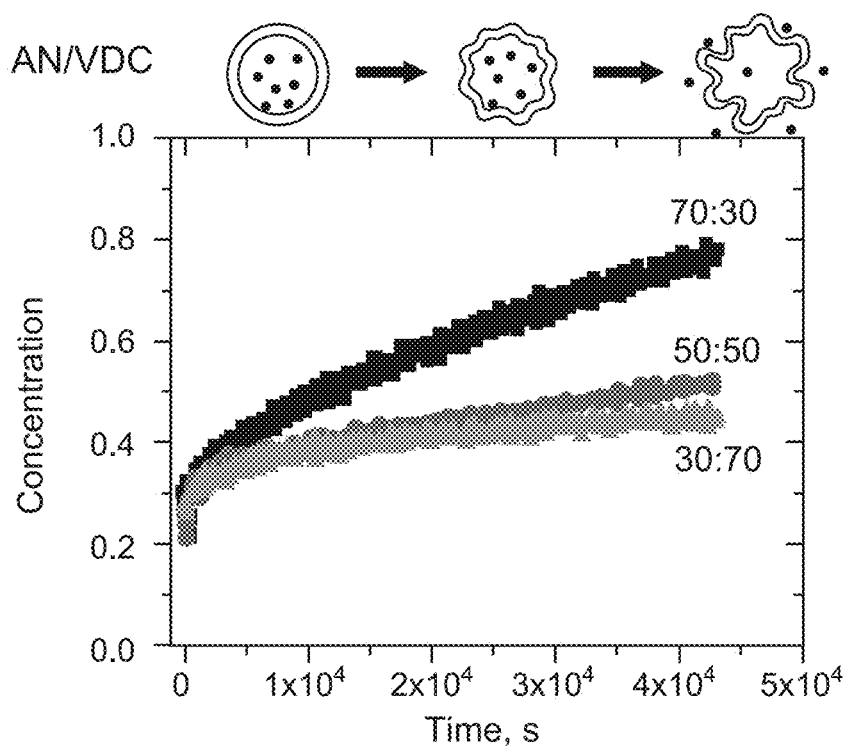
FIGS. 12A-B illustrate release rate versus degree of wrinkling for the wrinkled (12A) or spherical (12B) capsules formed from poly(acrylonitrile-co-vinylidenedichloride) and poly (acrylonitrile-co-acrylic acid) at shell:core volume ratios of 70:30, 50:50, and 30:70, in accordance with various embodiments.
Figure 12B:
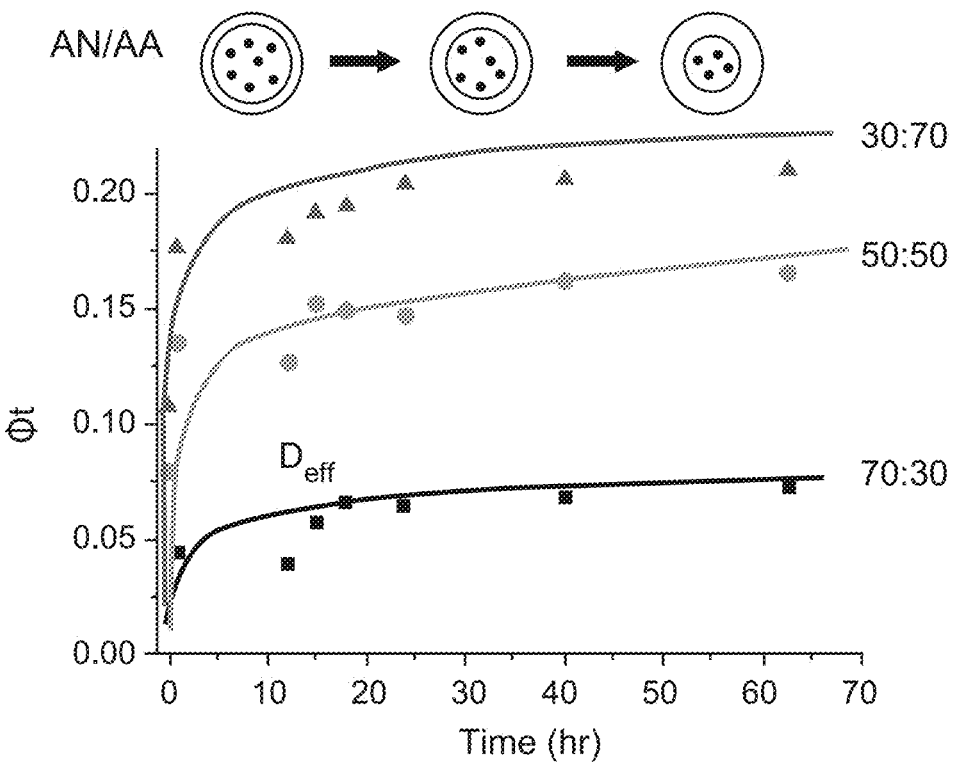

The procedure of Example 1 was followed using the conditions given in Table 8. The variations of shell:core ratio have caused the different influences for AN/VDC shell and AN/AA shell in the way that the increase of the shell fraction promotes the wrinkling for AN/VDC shell and the shell thickening for AN/AA shell, respectively. As summarized in Table 9 and FIG. 12A, the release rate of the poly(AN-co-VDC) capsules demonstrated a consistency with the degree of wrinkling. In contrast, the thickness variations were consistent with release rate of ORO dye from poly(AN-co-AA) capsules with three different shell:core ratio of 70:30, 50:50, 30:70. As summarized in Table 9 and FIG. 12B, the thicker shells resulted in a decrease of the release rate. The development of the AN/AA-based formulation is vital for accurate control of the shell thickness and release rate. The release model developed successfully described the release behaviors of both capsules in the way that $D_{\text{eff}} \sim \alpha/h^2$ for AN/VDC shell and $D_{\text{eff}} \sim 1/\alpha R^2$ for AN/AA shell. FIGS. 12A-B illustrate release rate versus degree of wrinkling for the wrinkled (12A) or spherical (12B) capsules formed from poly(AN-co-VDC) and poly(AN-co-AA) at shell:core volume ratios of 70:30, 50:50, and 30:70.

TABLE 8

Conditions for Example 9. The decane was n-decane.

| Monomer, conc. | Initiator, conc. | Crosslinker, conc. | Cargo, conc. | Shell:core volume ratio | Particle size (μm) | Shell thickness | W |
|---|---|---|---|---|---|---|---|
| AN/VDC 30/70 | AIBN, 1 wt % | TMPTA, 0.28 wt % | 5 mM ORO/n-decane | 70:30 | 3.7 | 0.54 | 5.3 |
| AN/VDC 30/70 | AIBN, 1 wt % | TMPTA, 0.28 wt % | 5 mM ORO/n-decane | 50:50 | 4.2 | 0.40 | 3.5 |
| AN/VDC 30/70 | AIBN, 1 wt % | TMPTA, 0.28 wt % | 5 mM ORO/n-decane | 30:70 | 3.1 | 0.41 | 1.1 |
| AA/AN 22/78 | AIBN, 1 wt % | TMPTA, 0.28 wt % | 5 mM ORO/n-decane | 70:30 | 4.3 | 0.39 | 1.3 |
| AA/AN 22/78 | AIBN, 1 wt % | TMPTA, 0.28 wt % | 5 mM ORO/n-decane | 50:50 | 4.0 | 0.63 | 1.2 |
| AA/AN 22/78 | AIBN, 1 wt % | TMPTA, 0.28 wt % | 5 mM ORO/n-decane | 30:70 | 4.2 | 0.94 | 1.1 |

TABLE 9

Correlation between microcapsule dimensions and release rate for poly(AN-co-VDC) and poly(AN-co-AA) microcapsules.

| Parameters | PAN/PVDC | | | Parameters | PAN/PAA | | |
|---|---|---|---|---|---|---|---|
| Shell:core | 70:30 | 50:50 | 30:70 | Shell:core | 70:30 | 50:50 | 30:70 |
| $\alpha$ | 2.3 | 1.0 | 0.4 | $\alpha$ | 2.3 | 1.0 | 0.4 |
| R (μm) | 3.7 | 4.2 | 3.1 | R (μm) | 4.3 | 4.0 | 3.8 |
| h (μm) | 0.54 | 0.40 | 0.41 | h (μm) | 0.72 | 0.64 | 0.26 |
| $D_{eff}(hr^{-1})$ @ 90° C. | 0.08 | 0.04 | 0.036 | $D_{eff}(hr^{-1})$ @ 90° C. | 0.025 | 0.08 | 0.11 |
| W ($=S/S_0$) | 5.3 | 3.5 | 1.1 | W ($=S/S_0$) | 1 | 1 | 1.3 |
| $\alpha/h^2$ | 2.4 | 6.3 | 7.9 | $1/\alpha R^2$ | 0.02 | 0.06 | 0.17 |

The terms and expressions that have been employed are used as terms of description and not of limitation, and there is no intention in the use of such terms and expressions of excluding any equivalents of the features shown and described or portions thereof, but it is recognized that various modifications are possible within the scope of the embodiments of the present invention. Thus, it should be understood that although the present invention has been specifically disclosed by specific embodiments and optional features, modification and variation of the concepts herein disclosed may be resorted to by those of ordinary skill in the art, and that such modifications and variations are considered to be within the scope of embodiments of the present invention.

ADDITIONAL EMBODIMENTS

The following exemplary embodiments are provided, the numbering of which is not to be construed as designating levels of importance:

Embodiment 1 provides a method of treating a subterranean formation, the method comprising:
placing in the subterranean formation a composition comprising at least one wrinkled capsule, the wrinkled capsule comprising
a hydrophobic core; and
a wrinkled shell.

Embodiment 2 provides the method of Embodiment 1, wherein the method further comprises obtaining or providing the composition, wherein the obtaining or providing of the composition occurs above-surface.

Embodiment 3 provides the method of any one of Embodiments 1-2, wherein the method further comprises obtaining or providing the composition, wherein the obtaining or providing of the composition occurs in the subterranean formation.

Embodiment 4 provides the method of any one of Embodiments 1-3, wherein the composition is an aqueous or oil-based fluid comprising a drilling fluid, stimulation fluid, fracturing fluid, spotting fluid, clean-up fluid, completion fluid, remedial treatment fluid, abandonment fluid, pill, acidizing fluid, cementing fluid, packer fluid, logging fluid, imaging fluid, or a combination thereof.

Embodiment 5 provides the method of any one of Embodiments 1-4, comprising using the composition to perform in the subterranean formation drilling, fracturing, spotting, clean-up, completion, remedial treatment, abandonment, treatment with a pill, acidizing, cementing, packing, logging, imaging, or a combination thereof.

Embodiment 6 provides the method of any one of Embodiments 1-5, comprising using the composition to block pores or flowpaths, wherein the wrinkled capsule at least in part blocks the pores or flowpaths.

Embodiment 7 provides the method of any one of Embodiments 1-6, wherein the one or more wrinkled capsules are about 0.001 wt % to about 100 wt % of the composition.

Embodiment 8 provides the method of any one of Embodiments 1-7, wherein the wrinkled capsule has a particle size of about 0.1 microns to about 500 microns.

Embodiment 9 provides the method of any one of Embodiments 1-8, wherein the wrinkled capsule has a particle size of about 1 micron to about 100 microns.

Embodiment 10 provides the method of any one of Embodiments 1-9, wherein the shell completely covers the surface area of the core.

Embodiment 11 provides the method of any one of Embodiments 1-10, wherein the shell has a thickness of about 1 nm to about 10 microns.

Embodiment 12 provides the method of any one of Embodiments 1-11, wherein the shell has a thickness of about 10 nm to about 1 micron.

Embodiment 13 provides the method of any one of Embodiments 1-12, wherein the shell comprises at least one wrinkle, dimple, fold, crease, corrugation, crumple, depression, pucker, ridge, or a combination thereof.

Embodiment 14 provides the method of any one of Embodiments 1-13, wherein the shell is about 0.001 wt % to about 90 wt % of the wrinkled capsule.

Embodiment 15 provides the method of any one of Embodiments 1-14, wherein the shell is about 10 wt % to about 60 wt % of the wrinkled capsule.

Embodiment 16 provides the method of any one of Embodiments 1-15, wherein the shell is about 0.001 vol % to about 99.999 vol % of the wrinkled capsule.

Embodiment 17 provides the method of any one of Embodiments 1-16, wherein the shell is about 10 vol % to about 70 vol % of the wrinkled capsule.

Embodiment 18 provides the method of any one of Embodiments 1-17, wherein the shell comprises one or more polymers each independently comprising one or more repeating units formed by polymerization of a substituted or unsubstituted ($C_3$-$C_{50}$)alkenoic acid or a salt or substituted or unsubstituted ($C_1$-$C_{50}$)hydrocarbyl ester thereof, a substituted or unsubstituted ($C_2$-$C_{50}$)alkenylnitrile, a substituted or unsubstituted ($C_2$-$C_{50}$)alkenyl($C_6$-$C_{50}$)aryl, a halide-substituted ($C_2$-$C_{50}$)alkene wherein the ($C_2$-$C_{50}$)alkene is further substituted or unsubstituted, or a combination thereof.

Embodiment 19 provides the method of Embodiment 18, wherein the one or more polymers are about 50 wt % to about 100 wt % of the shell.

Embodiment 20 provides the method of any one of Embodiments 18-19, wherein the one or more polymers are about 100 wt % of the shell.

Embodiment 21 provides the method of any one of Embodiments 18-20, wherein the one or more polymers in the shell comprise one or more repeating units formed by polymerization of a substituted or unsubstituted acrylic acid or a salt or substituted or unsubstituted ($C_1$-$C_5$)alkyl ester thereof, a substituted or unsubstituted acrylonitrile, a substituted or unsubstituted styrene, a halide-substituted ethene, or a combination thereof.

Embodiment 22 provides the method of any one of Embodiments 18-21, wherein the one or more polymers in the shell comprise one or more repeating units formed by polymerization of hydroxyethyl methacrylate (HEMA), acrylic acid (AA), tert-butyl acrylate (tBA), vinylidene chloride (VDC), acrylonitrile (AN), styrene, methyl methacrylate (MMA), ethyl methacrylate (EMA), methacrylic acid (MAA), or a combination thereof.

Embodiment 23 provides the method of any one of Embodiments 18-22, wherein the one or more polymers in the shell comprise a methacrylic acid/styrene copolymer, an acrylonitrile/vinylidene chloride copolymer, an acrylonitrile/acrylic acid copolymer, a methyl methacrylate/acrylonitrile/vinylidene chloride copolymer, or a combination thereof.

Embodiment 24 provides the method of any one of Embodiments 18-23, wherein the one or more polymers in the shell comprise one or more repeating units formed by polymerization of hydroxyethyl methacrylate (HEMA), acrylic acid (AA), tert-butyl acrylate (tBA), vinylidene chloride (VDC), acrylonitrile (AN), or a combination thereof.

Embodiment 25 provides the method of any one of Embodiments 18-24, wherein the one or more polymers in the shell comprise an acrylonitrile/vinylidene chloride copolymer, an acrylonitrile/acrylic acid copolymer, or a combination thereof.

Embodiment 26 provides the method of any one of Embodiments 18-25, wherein the one or more polymers in the shell are crosslinked via a polyvinyl crosslinker selected from the group consisting of a $(C_1-C_{20})$alkylenebiacrylamide, a poly$((C_1-C_{20})$alkenyl)-substituted mono- or poly-$(C_1-C_{20})$alkyl ether, a poly$(C_2-C_{20})$alkenylbenzene, pentaerythritol triallyl ether, a polyethyleneglycol-diacrylate, polyethyleneglycol-dimethacrylate, N,N'-methylenebisacrylamide, epichlorohydrin, divinyl sulfone, glycidyl methacrylate, an alkyl diacrylate, ethylene glycol diacrylate, ethylene glycol dimethacrylate, polyethylene glycol diacrylate, polyethylene glycol dimethacrylate, ethoxylated bisphenol A diacrylate, ethoxylated bisphenol A dimethacrylate, ethoxylated trimethylol propane triacrylate, ethoxylated trimethylol propane trimethacrylate, ethoxylated glyceryl triacrylate, ethoxylated glyceryl trimethacrylate, ethoxylated pentaerythritol tetraacrylate, ethoxylated pentaerythritol tetramethacrylate, ethoxylated dipentaerythritol hexaacrylate, polyglyceryl monoethylene oxide polyacrylate, polyglyceryl polyethylene glycol polyacrylate, dipentaerythritol hexaacrylate, dipentaerythritol hexamethacrylate, neopentyl glycol diacrylate, neopentyl glycol dimethacrylate, pentaerythritol triacrylate, pentaerythritol trimethacrylate, trimethylol propane triacrylate, trimethylol propane trimethacrylate, tricyclodecane dimethanol diacrylate, tricyclodecane dimethanol dimethacrylate, 1,6-hexanediol diacrylate, 1,6-hexanediol dimethacrylate, and combinations thereof.

Embodiment 27 provides the method of any one of Embodiments 1-26, wherein the core is about 10 wt % to about 99.999 wt % of the wrinkled capsule.

Embodiment 28 provides the method of any one of Embodiments 1-27, wherein the core is about 40 wt % to about 90 wt % of the wrinkled capsule.

Embodiment 29 provides the method of any one of Embodiments 1-28, wherein the core is about 0.001 vol % to about 99.999 vol % of the wrinkled capsule.

Embodiment 30 provides the method of any one of Embodiments 1-29, wherein the core is about 5 vol % to about 90 vol % of the wrinkled capsule.

Embodiment 31 provides the method of any one of Embodiments 1-30, wherein the core comprises a hydrophobic medium.

Embodiment 32 provides the method of Embodiment 31, wherein the hydrophobic medium comprises an oil, an organic solvent, or a combination thereof.

Embodiment 33 provides the method of any one of Embodiments 31-32, wherein the hydrophobic core medium is about 0.01 wt % to about 100 wt % of the core.

Embodiment 34 provides the method of any one of Embodiments 31-33, wherein the hydrophobic core medium is about 10 wt % to about 90 wt % of the core.

Embodiment 35 provides the method of any one of Embodiments 1-34, wherein the core comprises at least one cargo.

Embodiment 36 provides the method of Embodiment 35, wherein the one or more cargo is about 0.001 wt % to about 99.99 wt % of the core.

Embodiment 37 provides the method of any one of Embodiments 35-36, wherein the one or more cargo is about 10 wt % about 90 wt % of the core.

Embodiment 38 provides the method of any one of Embodiments 35-37, wherein the cargo is a blowing agent, a lubricant, a tracer, a dye, a contrast enhancer, an acid, an acid-forming reagent, a base, a base-forming reagent, an amine, a catalyst, a breaker, an inorganic particle, a proppant, a liquid, a gas, a dispersed solid, a multi-phase substance, or a combination thereof.

Embodiment 39 provides the method of Embodiment 38, wherein the blowing agent is a substituted or unsubstituted aliphatic $(C_1-C_{20})$hydrocarbon, a halogenated $(C_1-C_{20})$hydrocarbon that is otherwise substituted or unsubstituted, a tetra$(C_1-C_{10})$alkylsilane, or a combination thereof.

Embodiment 40 provides the method of any one of Embodiments 38-39, wherein the blowing agent is an unsubstituted aliphatic $(C_1-C_{20})$hydrocarbon, a halogenated $(C_1-C_{20})$hydrocarbon that is otherwise unsubstituted, a tetra$(C_1-C_{10})$alkylsilane, or a combination thereof.

Embodiment 41 provides the method of any one of Embodiments 35-40, further comprising releasing at least part of the cargo from the core into the subterranean formation.

Embodiment 42 provides the method of Embodiment 41, wherein the releasing comprises diffusing at least part of the cargo from the core through the shell and into the surrounding environment.

Embodiment 43 provides the method of any one of Embodiments 41-42, wherein the releasing comprises breaking the shell.

Embodiment 44 provides the method of any one of Embodiments 1-43, further comprising combining the composition with an aqueous or oil-based fluid comprising a drilling fluid, stimulation fluid, fracturing fluid, spotting fluid, clean-up fluid, completion fluid, remedial treatment fluid, abandonment fluid, pill, acidizing fluid, cementing fluid, packer fluid, logging fluid, or a combination thereof, to form a mixture, wherein the placing the composition in the subterranean formation comprises placing the mixture in the subterranean formation.

Embodiment 45 provides the method of any one of Embodiments 1-44, wherein the core, the shell, or the composition further comprises water, saline, aqueous base, oil, organic solvent, synthetic fluid oil phase, aqueous solution, alcohol or polyol, cellulose, starch, alkalinity control agent, acidity control agent, density control agent, density modifier, emulsifier, dispersant, polymeric stabilizer, polyacrylamide, polymer or combination of polymers, antioxidant, heat stabilizer, foam control agent, solvent, diluent, plasticizer, filler or inorganic particle, pigment, dye, precipitating agent, oil-wetting agent, set retarding additive, surfactant, corrosion inhibitor, gas, weight reducing additive, heavy-weight additive, lost circulation material, filtration control additive, salt, fiber, thixotropic additive, breaker, crosslinker, gas, rheology modifier, curing accelerator, curing retarder, pH modifier, chelating agent, scale inhibitor, enzyme, resin, water control material, polymer, oxidizer, a marker, Portland cement, pozzolana cement, gypsum cement, high alumina content cement, slag cement, silica cement, fly ash, metakaolin, shale, zeolite, a crystalline silica compound, amorphous silica, fibers, a hydratable clay, microspheres, pozzolan lime, or a combination thereof.

Embodiment 46 provides the method of any one of Embodiments 1-45, wherein the placing of the composition in the subterranean formation comprises pumping the composition through a tubular disposed in a wellbore and into the subterranean formation.

Embodiment 47 provides the method of any one of Embodiments 1-46, wherein the placing of the composition in the subterranean formation comprises pumping the composition through a drill string disposed in a wellbore, through a drill bit at a downhole end of the drill string, and back above-surface through an annulus.

Embodiment 48 provides the method of Embodiment 47, further comprising processing the composition exiting the annulus with at least one fluid processing unit to generate a cleaned composition and recirculating the cleaned composition through the wellbore.

Embodiment 49 provides a system for performing the method of any one of Embodiments 1-48, the system comprising:
a tubular disposed in the subterranean formation; and
a pump configured to pump the composition in the subterranean formation through the tubular.

Embodiment 50 provides a system for performing the method of any one of Embodiments 1-48, the system comprising:
a drill string disposed in a wellbore, the drill string comprising a drill bit at a downhole end of the drill string;
an annulus between the drill string and the wellbore; and
a pump configured to circulate the composition through the drill string, through the drill bit, and back above-surface through the annulus.

Embodiment 51 provides a method of treating a subterranean formation, the method comprising:
placing in the subterranean formation a composition comprising at least one wrinkled capsule having a particle size of about 0.1 microns to about 500 microns, the wrinkled capsule comprising
a hydrophobic core that is about 0.001 vol % to about 99.999 vol % of the wrinkled capsule, the hydrophobic core comprising a hydrophobic medium comprising an oil, an organic solvent, or a combination thereof; and
a wrinkled shell that is about 1 nm to about 10 microns thick and that is about 0.001 vol % to about 99.999 vol % of the wrinkled capsule, the wrinkled shell comprising one or more polymers each independently comprising one or more repeating units formed by polymerization of a substituted or unsubstituted ($C_3$-$C_{50}$) alkenoic acid or a salt or substituted or unsubstituted ($C_1$-$C_{50}$)hydrocarbyl ester thereof, a substituted or unsubstituted ($C_2$-$C_{50}$)alkenylnitrile, a substituted or unsubstituted ($C_2$-$C_{50}$)alkenyl($C_6$-$C_{50}$)aryl, a halide-substituted ($C_2$-$C_{50}$)alkene wherein the ($C_2$-$C_{50}$)alkene is further substituted or unsubstituted, or a combination thereof.

Embodiment 52 provides the method of Embodiment 51, wherein the core further comprises cargo comprising a blowing agent, a lubricant, a tracer, a dye, a contrast enhancer, an acid, an acid-forming reagent, a base, a base-forming reagent, an amine, a catalyst, a breaker, an inorganic particle, a proppant, a liquid, a gas, a dispersed solid, a multi-phase substance, or a combination thereof, wherein the method further comprises releasing the cargo in the subterranean formation.

Embodiment 53 provides a system comprising:
a tubular disposed in a subterranean formation; and
a pump configured to pump a composition comprising at least one wrinkled capsule in the subterranean formation through the tubular, wherein the wrinkled capsule comprises
a hydrophobic core; and
a wrinkled shell.

Embodiment 54 provides the system of Embodiment 53, further comprising
the tubular comprises a drill string disposed in a wellbore, the drill string comprising a drill bit at a downhole end of the drill string; and
an annulus between the drill string and the wellbore;
wherein the pump is configured to circulate the composition through the drill string, through the drill bit, and back above-surface through the annulus.

Embodiment 55 provides the system of Embodiment 54, further comprising a fluid processing unit configured to process the composition exiting the annulus to generate a cleaned drilling fluid for recirculation through the wellbore.

Embodiment 56 provides a wrinkled capsule for treatment of a subterranean formation, the wrinkled capsule comprising:
a hydrophobic core; and
a wrinkled shell.

Embodiment 57 provides a wrinkled capsule for treatment of a subterranean formation, the wrinkled capsule comprising:
a hydrophobic core that is about 0.001 vol % to about 99.999 vol % of the wrinkled capsule, the hydrophobic core comprising a hydrophobic medium comprising an oil, an organic solvent, or a combination thereof; and
a wrinkled shell that is about 1 nm to about 10 microns thick and that is about 0.001 vol % to about 99.999 vol % of the wrinkled capsule, the wrinkled shell comprising one or more polymers each independently comprising one or more repeating units formed by polymerization of a substituted or unsubstituted ($C_3$-$C_{50}$)alkenoic acid or a salt or substituted or unsubstituted ($C_1$-$C_{50}$)hydrocarbyl ester thereof, a substituted or unsubstituted ($C_2$-$C_{50}$)alkenylnitrile, a substituted or unsubstituted ($C_2$-$C_{50}$)alkenyl($C_6$-$C_{50}$)aryl, a halide-substituted ($C_2$-$C_{50}$)alkene wherein the ($C_2$-$C_{50}$)alkene is further substituted or unsubstituted, or a combination thereof, wherein the wrinkled capsule has a particle size of about 0.1 microns to about 500 microns.

Embodiment 58 provides the wrinkled capsule of Embodiment 57, wherein the core further comprises cargo comprising a blowing agent, a lubricant, a tracer, a dye, a contrast enhancer, an acid, an acid-forming reagent, a base, a base-forming reagent, an amine, a catalyst, a breaker, an inorganic particle, a proppant, a liquid, a gas, a dispersed solid, a multi-phase substance, or a combination thereof.

Embodiment 59 provides a method of preparing a composition for treatment of a subterranean formation, the method comprising:
forming a composition comprising at least one wrinkled capsule, the wrinkled capsule comprising
a hydrophobic core; and
a wrinkled shell.

Embodiment 60 provides the method of Embodiment 59, wherein the method comprises:
forming droplets of a hydrophobic medium in water, wherein the droplets include shell monomers; and polymerizing the monomers, to form a shell around each droplet, to form the wrinkled capsule.

Embodiment 61 provides the method of Embodiment 60, further comprising:

after the forming of the droplets and before the polymerizing, expanding the droplets; and after the polymerizing, contracting the droplets, to form the wrinkled capsule.

Embodiment 62 provides the method of any one of Embodiments 60-61, wherein the formed droplets comprise initiator and crosslinker.

Embodiment 63 provides the method of any one of Embodiments 60-62, wherein the formed droplets comprise cargo.

Embodiment 64 provides the method, system, wrinkled capsules, or composition of any one or any combination of Embodiments 1-63 optionally configured such that all elements or options recited are available to use or select from.

What is claimed is:

1. A method of treating a subterranean formation, the method comprising:
   placing in the subterranean formation a composition comprising at least one wrinkled capsule, the wrinkled capsule comprising:
      a hydrophobic core, wherein the hydrophobic core is about 40 wt % to about 90 wt % of the wrinkled capsule, wherein the hydrophobic core comprises a hydrophobic medium, wherein the hydrophobic medium comprises an oil, an organic solvent, or a combination thereof, wherein the hydrophobic core medium is about 10 wt % to about 90 wt % of the core; and
      a wrinkled shell, wherein the wrinkled shell encapsulates the hydrophobic core.

2. The method of claim 1, wherein the method further comprises obtaining or providing the composition, wherein the obtaining or providing of the composition occurs above-surface, in the subterranean formation, or a combination of above surface and in the subterranean formation.

3. The method of claim 1, wherein the composition is an aqueous or oil-based fluid comprising a drilling fluid, stimulation fluid, fracturing fluid, spotting fluid, clean-up fluid, completion fluid, remedial treatment fluid, abandonment fluid, pill, acidizing fluid, cementing fluid, packer fluid, logging fluid, imaging fluid, or a combination thereof.

4. The method of claim 1, comprising using the composition to perform in the subterranean formation drilling, fracturing, spotting, clean-up, completion, remedial treatment, abandonment, treatment with a pill, acidizing, cementing, packing, logging, imaging, or a combination thereof.

5. The method of claim 1, wherein the shell completely covers the surface area of the core, wherein the shell has a thickness of about 1 nm to about 10 microns, wherein the shell comprises at least one wrinkle, dimple, fold, crease, corrugation, crumple, depression, pucker, ridge, or a combination thereof, and wherein the shell is about 0.001 wt % to about 90 wt % of the wrinkled capsule.

6. The method of claim 1, wherein the shell comprises one or more polymers, wherein the one or more polymers are about 50 wt % to about 100 wt % of the shell, wherein the polymers are characterized by at least one of the following (i) each independently comprising one or more repeating units formed by polymerization of a substituted or unsubstituted ($C_3$-$C_{50}$)alkenoic acid or a salt or substituted or unsubstituted ($C_1$-$C_{50}$)hydrocarbyl ester thereof, a substituted or unsubstituted ($C_2$-$C_{50}$)alkenylnitrile, a substituted or unsubstituted ($C_2$-$C_{50}$)alkenyl($C_6$-$C_{50}$)aryl, a halide-substituted ($C_2$-$C_{50}$)alkene wherein the ($C_2$-$C_{50}$)alkene is further substituted or unsubstituted, or a combination thereof, (ii) each independently comprising one or more repeating units formed by polymerization of hydroxyethyl methacrylate (HEMA), acrylic acid (AA), tert-butyl acrylate (tBA), vinylidene chloride (VDC), acrylonitrile (AN), styrene, methyl methacrylate (MMA), ethyl methacrylate (EMA), methacrylic acid (MAA), or a combination thereof, or (iii) each independently comprising a methacrylic acid/styrene copolymer, an acrylonitrile/vinylidene chloride copolymer, an acrylonitrile/acrylic acid copolymer, a methyl methacrylate/acrylonitrile/vinylidene chloride copolymer, or a combination thereof, wherein the one or more polymers in the shell are crosslinked via a polyvinyl crosslinker selected from the group consisting of a ($C_1$-$C_{20}$)alkylenebiacrylamide, a poly(($C_1$-$C_{20}$)alkenyl)-substituted mono- or poly-($C_1$-$C_{20}$)alkyl ether, a poly($C_2$-$C_{20}$)alkenylbenzene, pentaerythritol triallyl ether, a polyethyleneglycol-diacrylate, polyethyleneglycol-dimethacrylate, N,N'-methylenebisacrylamide, epichlorohydrin, divinyl sulfone, glycidyl methacrylate, an alkyl diacrylate, ethylene glycol diacrylate, ethylene glycol dimethacrylate, polyethylene glycol diacrylate, polyethylene glycol dimethacrylate, ethoxylated bisphenol A diacrylate, ethoxylated bisphenol A dimethacrylate, ethoxylated trimethylol propane triacrylate, ethoxylated trimethylol propane trimethacrylate, ethoxylated glyceryl triacrylate, ethoxylated glyceryl trimethacrylate, ethoxylated pentaerythritol tetraacrylate, ethoxylated pentaerythritol tetramethacrylate, ethoxylated dipentaerythritol hexaacrylate, polyglyceryl monoethylene oxide polyacrylate, polyglyceryl polyethylene glycol polyacrylate, dipentaerythritol hexaacrylate, dipentaerythritol hexamethacrylate, neopentyl glycol diacrylate, neopentyl glycol dimethacrylate, pentaerythritol triacrylate, pentaerythritol trimethacrylate, trimethylol propane triacrylate, trimethylol propane trimethacrylate, tricyclodecane dimethanol diacrylate, tricyclodecane dimethanol dimethacrylate, 1,6-hexanediol diacrylate, 1,6-hexanediol dimethacrylate, and combinations thereof.

7. The method of claim 1, wherein the core comprises at least one cargo, wherein the method further comprises releasing at least part of the cargo from the core into the subterranean formation, wherein the at least one cargo is about 10 wt % about 90 wt % of the core, wherein the cargo is a blowing agent, a lubricant, a tracer, a dye, a contrast enhancer, an acid, an acid-forming reagent, a base, a base-forming reagent, an amine, a catalyst, a breaker, an inorganic particle, a proppant, a liquid, a gas, a dispersed solid, a multi-phase substance, or a combination thereof.

8. The method of claim 1, further comprising combining the composition with an aqueous or oil-based fluid comprising a drilling fluid, stimulation fluid, fracturing fluid, spotting fluid, clean-up fluid, completion fluid, remedial treatment fluid, abandonment fluid, pill, acidizing fluid, cementing fluid, packer fluid, logging fluid, or a combination thereof, to form a mixture.

9. The method of claim 1, wherein the core, the shell, or the composition further comprises water, saline, aqueous base, oil, organic solvent, synthetic fluid oil phase, aqueous solution, alcohol or polyol, cellulose, starch, alkalinity control agent, acidity control agent, density control agent, density modifier, emulsifier, dispersant, polymeric stabilizer, polyacrylamide, polymer or combination of polymers, antioxidant, heat stabilizer, foam control agent, solvent, diluent, plasticizer, filler or inorganic particle, pigment, dye, precipitating agent, oil-wetting agent, set retarding additive, surfactant, corrosion inhibitor, gas, weight reducing additive, heavy-weight additive, lost circulation material, filtration control additive, salt, fiber, thixotropic additive, breaker, crosslinker, gas, rheology modifier, curing accelerator, curing retarder, pH modifier, chelating agent, scale inhibitor, enzyme, resin, water control material, polymer, oxidizer, a marker, Portland cement, pozzolana cement, gypsum cement, high alumina content cement, slag cement, silica cement, fly ash, metakaolin, shale, zeolite, a crystalline silica compound, amorphous silica, fibers, a hydratable clay, microspheres, pozzolan lime, or a combination thereof.

10. The method of claim 1, wherein the placing of the composition in the subterranean formation comprises pumping the composition through a tubular disposed in a wellbore and into the subterranean formation, circulating the composition back above-surface through an annulus, processing the composition exiting the annulus with at least one fluid processing unit to generate a cleaned composition, and recirculating the cleaned composition through the wellbore.

11. The method of claim 1, wherein the method further comprises obtaining or providing the composition, wherein the obtaining or providing of the composition occurs in the subterranean formation.

12. The method of claim 1, wherein the wrinkled capsule has a particle size of about 0.1 microns to about 500 microns.

13. A system comprising:
a tubular disposed in a subterranean formation; and
a pump configured to pump a composition comprising at least one wrinkled capsule in the subterranean formation through the tubular, wherein the wrinkled capsule comprises:
a hydrophobic core, wherein the hydrophobic core is about 40 wt % to about 90 wt % of the wrinkled capsule, wherein the hydrophobic core comprises a hydrophobic medium, wherein the hydrophobic medium comprises an oil, an organic solvent, or a combination thereof, wherein the hydrophobic core medium is about 10 wt % to about 90 wt % of the core; and
a wrinkled shell wherein the wrinkled shell encapsulates the hydrophobic core.

14. The system of claim 13,
wherein the tubular further comprises a drill string disposed in a wellbore, the drill string comprises a drill bit at a downhole end of the drill string; wherein the system further comprises:
an annulus between the drill string and the wellbore,
wherein the pump is configured to circulate the composition through the drill string, the drill bit, and back above-surface through the annulus; and
a fluid processing unit configured to process the composition exiting the annulus to generate a cleaned drilling fluid for recirculation through the wellbore.

15. A method of preparing a composition for treatment of a subterranean formation, the method comprising:
forming a composition comprising at least one wrinkled capsule, the wrinkled capsule comprising:
a hydrophobic core, wherein the hydrophobic core is about 40 wt % to about 90 wt % of the wrinkled capsule, wherein the hydrophobic core comprises a hydrophobic medium, wherein the hydrophobic medium comprises an oil, an organic solvent, or a combination thereof, wherein the hydrophobic core medium is about 10 wt % to about 90 wt % of the core; and
a wrinkled shell, wherein the wrinkled shell encapsulates the hydrophobic core.

16. A method of preparing a composition for treatment of a subterranean formation, the method comprising:
forming a composition comprising at least one wrinkled capsule, the wrinkled capsule comprising:
a hydrophobic core; and
a wrinkled shell, wherein the forming of the composition comprises:
forming droplets of a hydrophobic medium in water, wherein the droplets include shell monomers; and
polymerizing the monomers, to form a shell around each droplet, to form the wrinkled capsule.

17. The method of claim 16, further comprising:
after the forming of the droplets and before the polymerizing, expanding the droplets; and
after the polymerizing, contracting the droplets, to form the wrinkled capsule.

18. The method of claim 16, wherein the formed droplets comprise an initiator and a crosslinker.

19. The method of claim 16, wherein the formed droplets comprise cargo.

* * * * *